(12) United States Patent
Srivastava et al.

(10) Patent No.: US 12,461,822 B2
(45) Date of Patent: Nov. 4, 2025

(54) MECHANISM TO ENHANCE LINK BANDWIDTH IN INTERCONNECTS

(71) Applicant: QUALCOMM Incorporated, San Diego, CA (US)

(72) Inventors: Prakhar Srivastava, Lucknow (IN); Santhosh Reddy Akavaram, Hyderabad (IN); Chintalapati Bharath Sai Varma, Hyderabad (IN); Ravi Kumar Sepuri, Hyderabad (IN); Khushboo Kumari, Noida (IN)

(73) Assignee: Qualcomm Incorporated, San Diego, CA (US)

( * ) Notice: Subject to any disclaimer, the term of this patent is extended or adjusted under 35 U.S.C. 154(b) by 29 days.

(21) Appl. No.: 18/594,913

(22) Filed: Mar. 4, 2024

(65) Prior Publication Data
US 2025/0278336 A1   Sep. 4, 2025

(51) Int. Cl.
*G06F 11/14* (2006.01)
(52) U.S. Cl.
CPC ...... *G06F 11/1402* (2013.01); *G06F 2201/86* (2013.01)
(58) Field of Classification Search
CPC . G06F 11/1402; G06F 11/1423; G06F 11/141
USPC .................. 714/5.1, 4.5, 4.1, 4.11
See application file for complete search history.

(56) References Cited

U.S. PATENT DOCUMENTS

| | | | | |
|---|---|---|---|---|
| 11,646,861 B2* | 5/2023 | Meaney | ............... | H04L 7/0008 375/354 |
| 2022/0237138 A1* | 7/2022 | Lanka | ................. | G06F 13/4027 |
| 2022/0327276 A1* | 10/2022 | Seshan | ................. | G06F 13/382 |
| 2022/0342841 A1* | 10/2022 | Choudhary | ......... | G06F 13/4221 |
| 2024/0354279 A1* | 10/2024 | Doddi | ................. | G06F 13/4063 |
| 2025/0021504 A1* | 1/2025 | Doddi | ................. | G06F 13/4018 |

* cited by examiner

*Primary Examiner* — Chae M Ko
(74) *Attorney, Agent, or Firm* — Loza & Loza, LLP

(57) ABSTRACT

An integrated circuit (IC) device, implemented using chiplets mounted on a substrate, may include a controller and a first plurality of link modules. The first plurality of link modules may be configured to provide data lanes in a multimodule data communication link. The controller may be configured to retrain a failed link module in the first plurality of link modules while one or more other link modules in the first plurality of link modules are active and available for transmitting or receiving data, reconfigure the multimodule data communication link to use a second plurality of link modules that excludes the failed link module and includes fewer link modules than the first plurality of link modules, and reconfigure the multimodule data communication link to use the first plurality of link modules for transmitting or receiving the data after the failed link module has been successfully retrained.

20 Claims, 16 Drawing Sheets

MECHANISM TO ENHANCE LINK BANDWIDTH IN INTERCONNECTS

TECHNICAL FIELD

The present disclosure relates generally to integrated circuit technology and, more particularly to optimizing interconnects between chiplets.

BACKGROUND

Mobile communication devices typically include a variety of components such as circuit boards, integrated circuit (IC) devices, application-specific integrated circuit (ASIC) devices and/or System-on-Chip (SoC) devices. The types of components may include processing circuits, user interface components, storage and other peripheral components that communicate over a serial bus. State-of-the-art mobile application devices demand a small form factor, low cost, a tight power budget, and high electrical performance. For example, wearable processing and communication devices require SoCs and other IC devices that offer higher performance with reduced power requirements in smaller form-factors. Mobile package design has evolved to meet these divergent goals for enabling mobile applications that support multimedia enhancements.

Chiplet technology can be used to address some of the performance, power, size and other design requirements. Chiplets are a product of improved semi-conductor processing and logic design and can provide an increase in the quantity of logic circuits that can be included in integrated circuit devices. A processing system can be separated into subsystems that may be implemented as individual chiplets. An SoC can be optimized or customized by assembling a subset of available chiplets. The assembled chiplets may communicate with each other via one or more intra-chip data buses or similar data communication interconnects. A mobile application device may include multiple SoCs that communicate with each other via similar inter-chip interconnects.

Interconnects between chiplets can be implemented using some combination of point-to-point interfaces and multi-drop buses. Interconnect architectures may be based on a variety of technologies, including Peripheral Component Interconnect Express (PCIe), Universal Serial Bus, and others. Ever-increasing bandwidth and data throughput requirements have necessitated the development of more complex interconnect architectures that require calibration and training to ensure link reliability and integrity. There is an ongoing need to improve availability, training and repair techniques for interconnections used to couple chiplets in SoCs.

SUMMARY

Certain aspects of the disclosure relate to IC devices that include multiple chiplets and to retraining techniques that optimize availability of an interconnection between chiplets after a fault is detected in one or more link modules.

In various aspects of the disclosure, a method for operating an interconnection between chiplets includes transmitting or receiving data over a multimodule data communication link that uses a first plurality of link modules to provide data transmit lanes and data receive lanes, retraining a failed link module in the first plurality of link modules while one or more other link modules in the first plurality of link modules are active and available for transmitting or receiving data, reconfiguring the multimodule data communication link to use a second plurality of link modules that excludes the failed link module and includes fewer link modules than the first plurality of link modules, and reconfiguring the multimodule data communication link to use the first plurality of link modules for transmitting or receiving the data after the failed link module has been successfully retrained.

In various aspects of the disclosure, a processor-readable storage medium stores code that, when executed by a processor causes a processing circuit to transmit or receive data over a multimodule data communication link that uses a first plurality of link modules to provide data transmit lanes and data receive lanes, retrain a failed link module in the first plurality of link modules while one or more other link modules in the first plurality of link modules are active and available for transmitting or receiving data, reconfigure the multimodule data communication link to use a second plurality of link modules that excludes the failed link module and includes fewer link modules than the first plurality of link modules, and reconfigure the multimodule data communication link to use the first plurality of link modules for transmitting or receiving the data after the failed link module has been successfully retrained.

In various aspects of the disclosure, a communication interface in a chiplet includes a first plurality of link modules configured to provide data transmit lanes and data receive lanes in a multimodule data communication link, and a controller. The controller may be configured retrain a failed link module in the first plurality of link modules while one or more other link modules in the first plurality of link modules are active and available for transmitting or receiving data, reconfigure the multimodule data communication link to use a second plurality of link modules that excludes the failed link module and includes fewer link modules than the first plurality of link modules, and reconfigure the multimodule data communication link to use the first plurality of link modules for transmitting or receiving the data after the failed link module has been successfully retrained.

In certain aspects, the first plurality of link modules includes a first number of link modules that is defined by Universal Chiplet Interconnect Express (UCIe) specifications and the second plurality of link modules includes a second number of link modules that is defined by the UCIe specifications.

In certain aspects, the second plurality of link modules excludes at least one link module in the first plurality of link modules that is active and available for transmitting or receiving the data.

In certain aspects, the second plurality of link modules includes a quantity of link modules that is defined based on number of the other link modules in the first plurality of link modules that are active and available for transmitting or receiving data. The number of data transmit lanes and data receive lanes provided by each link module may be defined by UCIe specifications. In one example, each link module can be configured to provide 64 data transmit lanes and 64 data receive lanes in accordance with an advanced packaging option defined by the UCIe specifications. In another example, each link module can be configured to provide 16 data transmit lanes and 16 data receive lanes in accordance with a standard packaging option defined by the UCIe specifications.

In certain aspects, each link module in the first plurality of link modules may be caused to enter a link initialization state after the failed link module has been successfully retrained. Each link module in the first plurality of link modules may be bound to the multimodule data communication link in a corresponding link initialization state. A sideband link in one of the first plurality of link modules may be designated to transmit and receive link status and control messages for all bound link modules in the first plurality of link modules. A sideband link in one of the second plurality of link modules may be designated to transmit and receive link status and control messages for all bound link modules in the second plurality of link modules. Each link module in the first plurality of link modules may be bound to the multimodule data communication link in accordance with UCIe specifications. The failed link module may be retrained in accordance with UCIe specifications.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Data communication links employed by SoCs and other IC devices to connect processors with modems and other peripherals may be operated in accordance with industry or proprietary standards or protocols associated with certain functions or types of devices. In one example, the peripheral component interconnect express (PCIe) standard is a high-speed interface that enables transmission over a high-speed link at data rates measured in gigabits per second. A high-speed interface operated in accordance with PCIe standards and protocols has multiple standby modes when the link is inactive. In operation, one device acts as a host that can communicate through PCIe links with multiple devices, which may be referred to as endpoints. In a PCIe link, data is transmitted in differential signals over one or more two-line lanes. Lanes may provide duplex, serial point-to-point connections.

Serial data links may be used to interconnect certain electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, or any other similar functioning device.

Figure 1:
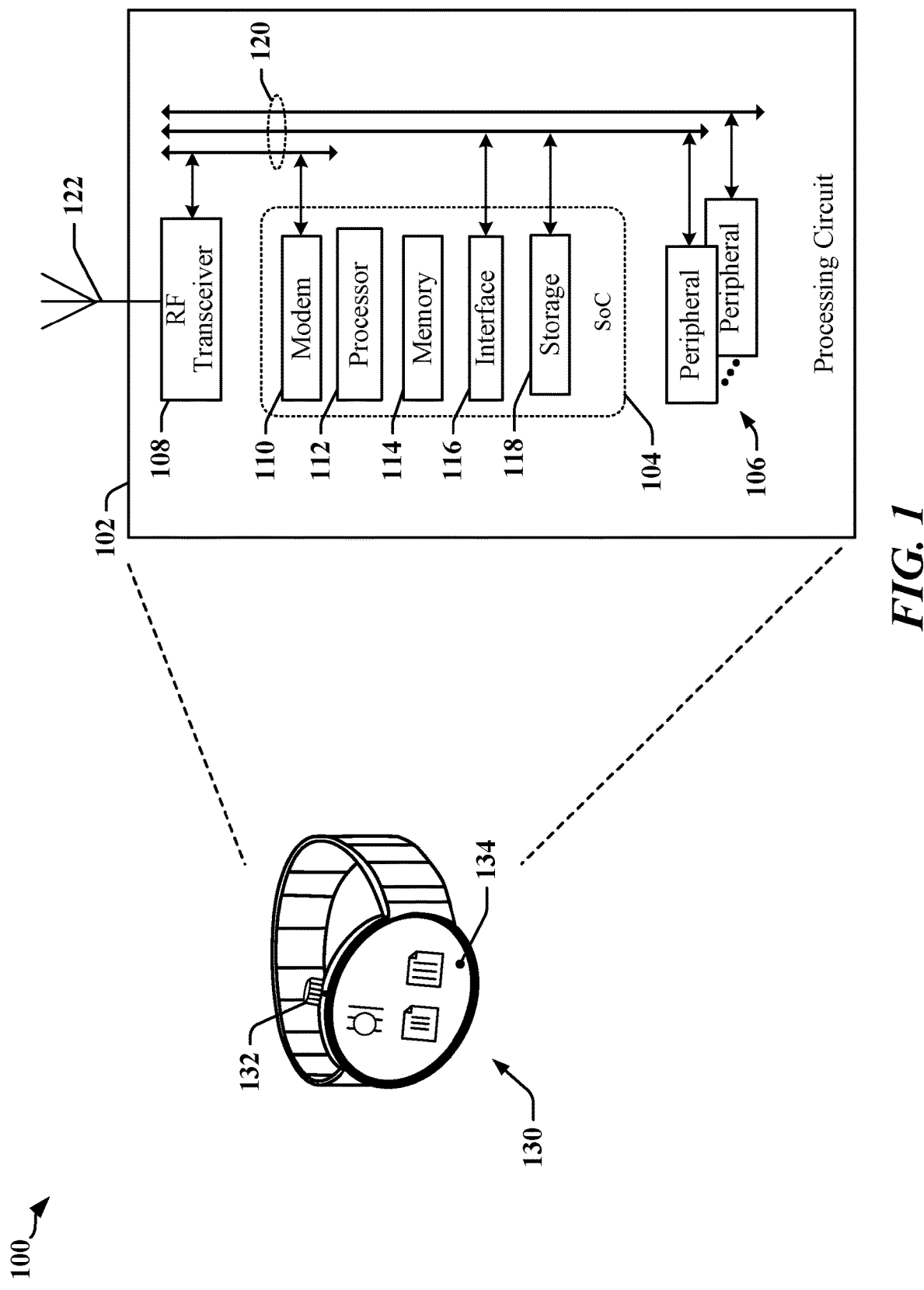
FIG. 1 illustrates an apparatus employing interconnected chiplets.

FIG. 1 illustrates an example of an apparatus 100 that may be implemented using multiple chiplets coupled through one or more data communication buses. The apparatus may be enclosed within a wearable device, such as the illustrated smartwatch 130. A processing circuit 102 of the apparatus 100 includes multiple circuits or devices 104, 106 and/or 108. In various examples, the processing circuit 102 is implemented using one or more ASICS, chiplets, an SoC or other devices arranged in a configuration that can be adapted for use in mobile computing, embedded computing, edge computing. In one example, the apparatus 100 may be configured to support multiple communication technologies, modes or protocols and the processing circuit 102 includes a combination of devices including an SoC 104, one or more peripheral devices 106, and a transceiver 108 that cooperate to enable the apparatus to communicate through an antenna 122 with a radio access network, a core access network, the Internet and/or another network.

The SoC 104 may include one or more processors 112, one or more modems 110, on-board memory 114, a bus interface circuit 116 and/or other logic circuits or functions.

The processing circuit 102 may be controlled by an operating system that provides an application programming interface (API) layer that enables the one or more processors 112 to execute software modules residing in the on-board memory 114 or other processor-readable storage 118 provided on the processing circuit 102. The software modules may include instructions and data stored in the on-board memory 114 or processor-readable storage 118. The SoC 104 may access its on-board memory 114, the processor-readable storage 118, and/or storage external to the processing circuit 102. The on-board memory 114, the processor-readable storage 118 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 122, a display 134, operator controls 132, switches or buttons, among other components. A user interface module may be configured to manage the display 134, operator controls 132, etc. and may communicate with other elements of the processing circuit 102 through one or more serial data interconnects.

The processing circuit 102 may provide multiple buses 120 that enable communication between two or more devices 104, 106, and/or 108. In one example, the SoC 104 may include bus interface circuits 116 coupled to one or more of the buses 120. Each of the bus interface circuits 116 may include a combination of circuits, counters, timers, control logic and other configurable circuits or modules. In one example, certain bus interface circuits 116 may be configured to operate in accordance with standards-defined communication specifications or protocols. The processing circuit 102 may include or control a power management function that configures and manages the operation of the apparatus 100.

The illustrated smartwatch 130, other portable or wearable processing and/or communication devices (referred to collectively as portable communication devices or PCDs), sensors, instruments, appliances and other such devices include one or more ICs. These devices may include mobile phones, tablet computers, palmtop computers, portable digital assistants (PDAs), portable game consoles, and other portable electronic devices. PCDs commonly contain integrated circuits or SoCs that include numerous components or subsystems designed to work together to deliver functionality to a user. The various SoC subsystems may communicate with each other via one or more intra-chip data buses or similar data communication interconnects. PCDs may have multiple SoCs that communicate with each other via similar inter-chip interconnects. The ICs are typically packaged in an IC package, which may be referred to as a "semiconductor package" or "chip package." The IC package typically includes a package substrate and one or more IC chips or other electronic modules mounted to the package substrate to provide electrical connectivity to the IC chips. For example, an IC chip in an IC package may be configured as an SoC. The IC chips are electrically coupled to other IC chips and/or to other components in the IC package through electrical coupling to metal lines in the package substrate. The IC chips can also be electrically coupled to other circuits outside the IC package through electrical connections of external metal interconnects (e.g., solder bumps) of the IC package.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs. Design rules for newer process technology that use low-voltage transistors may preclude the use of higher voltage transistors supported by previous process technology generations. The unavailability of certain higher-voltage transistors may present an impediment to circuit designers for IC devices that include multiple voltage domains.

The increasing complexity and functionality required from semiconductor devices tends to increase the physical dimensions of integrated circuit devices in which they are embodied. An upper limit on integrated circuit device is the maximum "reticle" size that in some instances refers to the size of the photomask used to manufacture the integrated circuit devices. Chiplets provide one approach to avoiding the maximum reticle size. Moreover, chiplet technology can be used to address some of the performance, power and size design requirements for complex SoCs, including SoCs used in certain mobile or wearable devices. The use of smaller dies can improve manufacturing yields.

Figure 2:
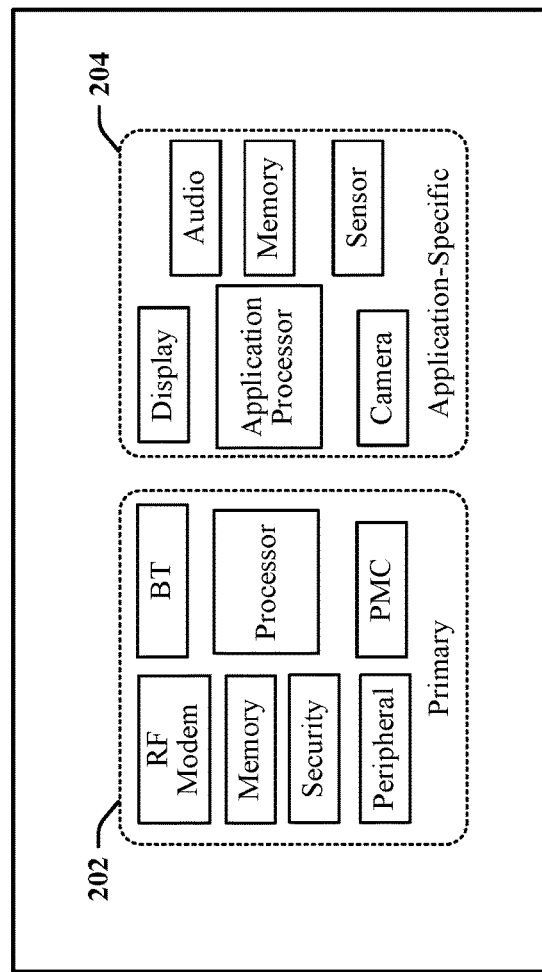
FIG. 2 illustrates certain aspects of an SoC constructed from chiplets.

The block diagram in FIG. 2 illustrates certain aspects of an SoC 200 that can be constructed using chiplets. The SoC 200 may be configured by selecting a combination of chiplets that implement certain subsystems or distinct functional elements. In the illustrated example, the SoC 200 includes a set of primary chiplets 202 that enable the SoC 200 to perform core processing, security and communication functions. The set of primary chiplets 202 include a processor, memory and one or more modems. The illustrated SoC 200 also includes a set of application-specific chiplets 204 that includes an application processor, display driver, camera interface and audio controller. In a remote sensing device or appliance, the audio-visual components could be omitted and may be replaced with analog-to-digital controllers, for example.

The SoC 200 may include a variety of processing engines, such as central processing units (CPUs) with multiple cores, graphical processing units (GPUs), digital signal processors (DSPs), neural processing units (NPUs), wireless transceiver units (also referred to as modems), peripherals, display and imaging interfaces, etc. Each of these subsystems and other functional elements can be implemented as an individual chiplet, or as a combination of chiplets. The chiplets included in the SoC 200 can be proprietary or may be acquired from a variety of sources. An SoC may be constructed from chiplets manufactured at different process nodes and/or operated at different voltages.

Figure 3:
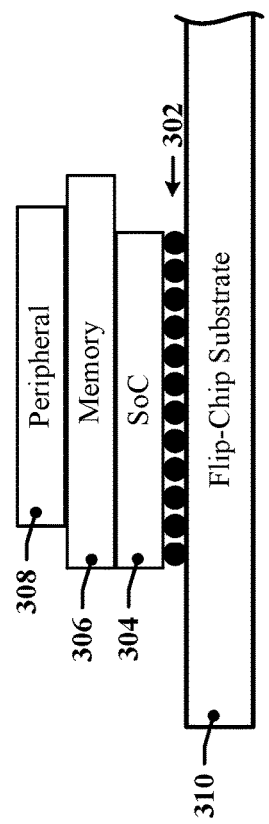
FIG. 3 illustrates an example of an SoC in which chiplets are stacked vertically on a substrate.

FIG. 3 illustrates an example of an SoC 300 in which certain chiplets 304, 306, 308 are stacked vertically on a substrate 310. Some chiplets can be included in stacks that are deployed across the surface of the substrate 310, while other chiplets may be individually mounted on the surface of the substrate. Chiplets may be mounted on the surface of the substrate using solder balls 302 that provide electrical and/or thermal coupling between substrate and the mounted chiplets. An interconnect structure may be formed that enables chiplets 304, 306, 308 in a stack of chiplets to communicate with one another, with other chiplets mounted on the substrate 310 and with input/output structures that connect the SoC 200 with other circuits, displays, imaging sensors and other peripherals with an apparatus.

The use of chiplets can reduce the areal size of the substrate 310 and increase three-dimensional packing density. The constituent chiplets may provide complex features and high performance within a smaller form-factor operated at lower power specifications. Moreover, each chiplet may define multiple power domains, operate at different frequencies and different chiplets may manage power/frequency modes independently and. In some instances, two or more chiplets may be operated in mutually exclusive power states. Additionally, operating conditions for an SoC depend on the type, number and arrangement of chiplets included on the substrate in addition to the modes of operation defined by applications. It is necessary to consider power usage by all chiplets in the SoC in order to ensure compliance with power budgets assigned for an application or device.

Conventional chiplet-based implementations suffer from limitations that include complex or difficult interconnect routing, local hotspots arising from routing congestion caused by connection architecture and challenges to signal timing specifications. In certain examples, local hotspots can arise from routing congestion, increased feature complexity and circuit concentrations. In certain examples, signal timing specifications can be compromised due to the necessity for an increased number of isolation clamps due to logic placement, number of voltage domains and reduced floorplan. Long wire crossings between chiplets can cause routing congestion and lossy interconnects.

Each chiplet in an SoC may be included to perform a specific function or type of function and the configuration of the chiplets can introduce further complexities and challenges for designers. For example, one chiplet may include radio frequency front end circuits that produce high frequency signals ranging up to 5 GHz or more, and may further include interfaces that are used by low-frequency power management circuits. A designer may import previously defined circuit blocks to implement some of the internal functions. These circuit blocks may be referred to as macros. Imported circuit blocks for a given process technology may be described, characterized or defined by a set of masks, hardware description language, specifications and test data. Commercially available or proprietary circuit blocks may be referred to as hard macros. Hard macros are tested and verified for a set of design and operating specifications. It is common for hard macros and other circuit blocks to define multiple power domains.

The Universal Chiplet Interconnect Express (UCIe) is an example of a standardized chiplet interconnect specification. The UCIe specification enables construction of large System-on-Chip (SoC) packages that in aggregate can exceed the maximum reticle size. The adoption of the UCIe specification has facilitated the integration of chiplets manufactured by different vendors into a single package. The UCIe specification enables the integration of chiplets fabricated using different silicon manufacturing processes into a single package, as required or desired for a specific device type, computing performance and/or to better meet power consumption budgets. The UCIe specification defines physical layer circuits and interconnects, protocol stacks and defines a software architecture and procedures to be used for compliance testing.

The UCIe specification defines different packaging options. One packaging option is the standard packaging option, which may also be referred to as the two-dimensional (2D) option. The standard packaging option may be applied to technology that can be used for low-cost devices and long-reach channels, where distances of between 10 mm and 25 mm may be considered to be long-reach. Another packaging option is the advanced packaging option, which may also be referred to as the 2.5D option. The advanced packaging option may be applied to technology that can be used for performance-optimized applications with short channel lengths. For example, channels that have a length that is less than 2 mm may be considered to be a short channel.

Figure 4:
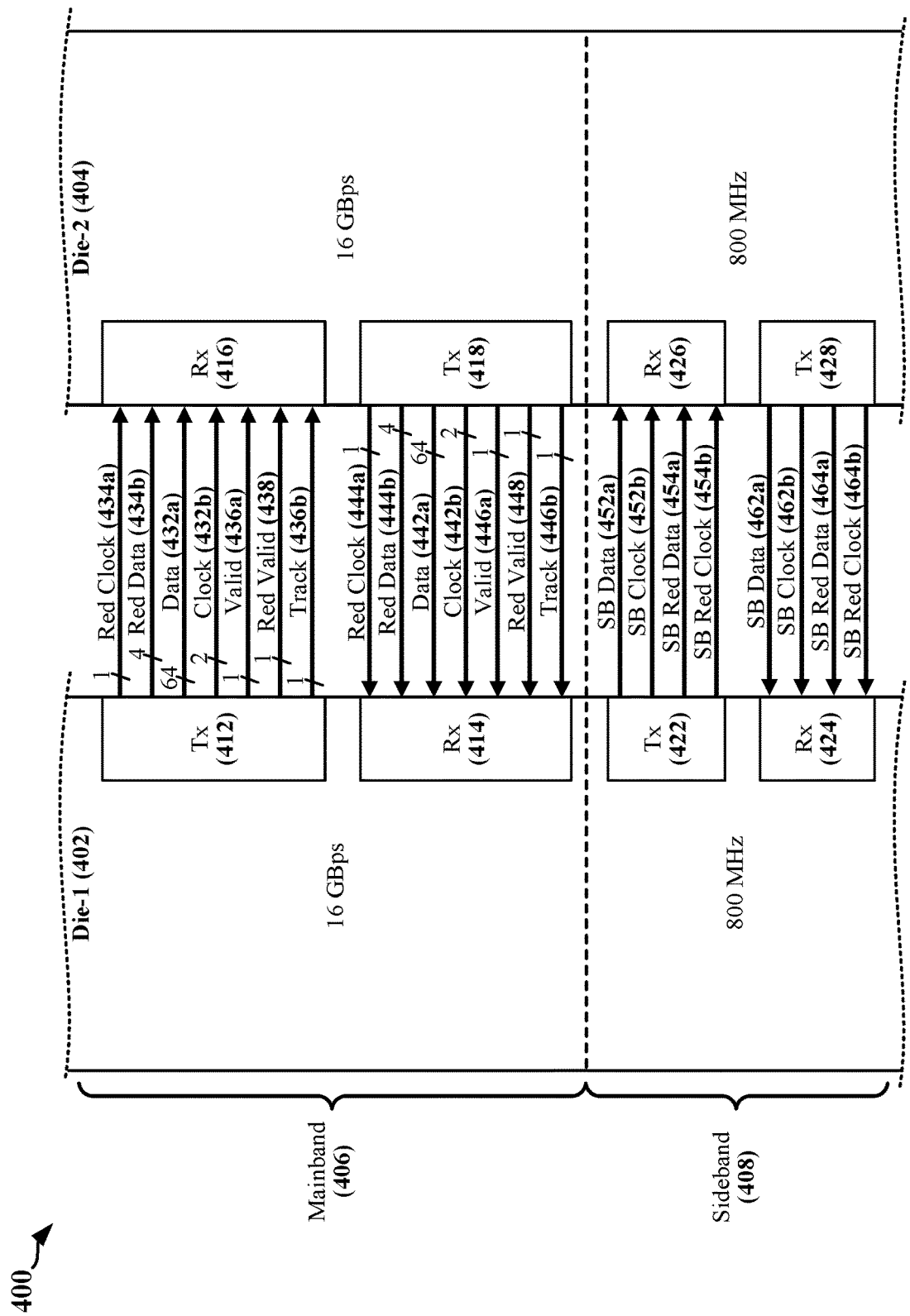
FIG. 4 illustrates an example of advanced packaging option implemented between a first die and a second die.

FIG. 4 illustrates an example of advanced packaging option link module 400 implemented between a first die 402 and a second die 404. The link module 400 provides an interface that supports separate high-speed communication and low-speed communication interfaces. A main communication link (the mainband link 406) provides the primary communication path and is used to exchange application data and messages. A secondary communication link (the sideband link 408) provides a communication path for control data, including link state and status messages, power management messages, error handling handshake messages, and messages related to transition negotiation regarding operational state of the first die 402 and a second die 404.

In the illustrated example, the mainband transmitter physical layer (PHY) circuit 412 in the first die 402 is coupled to a mainband data bus 432*a* over which up to 64-bit parallel data can be transmitted according to timing provided by one or more of two mainband clock signals transmitted over mainband clock lines 432*b*. The mainband data bus 432*a* and mainband clock lines 432*b* are driven by the mainband transmitter PHY circuit 412. The mainband transmitter PHY circuit 412 in the first die 402 may transmit a framing signal over a mainband valid line 436*a* to indicate framing information associated with transmitted data and a track signal over a track line 436*b* to enable the receiver to correct or adjust phase in received versions of the two mainband clock signals. The mainband transmitter PHY circuit 412 is coupled to six redundant pins of the first die 402. The redundant pins may be used to replace data or clock lines that do not function according to specification due to manufacturing process variances or low-quality results from a packaging process. The redundant pins can reduce yield loss.

The UCIe specification defines test and repair procedures that are based on the available redundant pins. One redundant pin is allocated for use as a redundant mainband clock line 434*a*, four redundant pins are allocated for transmission data over redundant mainband data lines 434*b* and one redundant pin is allocated for a redundant valid line 438.

The mainband receiver PHY circuit 416 in the second die 404 is coupled to the mainband data bus 432*a* over which it can receive up to 64-bit parallel data according to timing provided by one or more of two mainband clock signals received over the mainband clock lines 432*b*. The mainband clock signals are provided by the mainband transmitter PHY circuit 412 in the first die 402. The mainband receiver PHY circuit 416 in the second die 404 may receive a mainband valid signal over a mainband valid line 436*a* to indicate framing information associated with transmitted data and a track signal from the track line 436*b* to enable correction or adjustment of phase in the two mainband clock signals. The mainband receiver PHY circuit 416 is further coupled to six redundant pins of the second die 404. One redundant pin may be allocated as the redundant mainband clock line 434*a*, four redundant pins are allocated as the redundant mainband data lines 434*b* and one redundant pin is allocated as a redundant valid line 438.

The mainband transmitter PHY circuit 418 in the second die 404 is coupled to a primary mainband data bus 442*a* over which it can transmit up to 64-bit parallel data according to timing provided by one or more of two clock signals transmitted over clock lines 442*b* by the mainband transmitter PHY circuit 418. The mainband transmitter PHY circuit 418 in the second die 404 may transmit a mainband valid signal over the mainband valid line 446*a* to indicate framing information associated with transmitted data and a track signal over the track line 446*b* to enable the receiver to correct or adjust phase in received versions of the two clock signals transmitted over the clock lines 442*b*. The mainband transmitter PHY circuit 412 is coupled to a further six redundant pins of the second die 404. These redundant pins may be used to replace data or clock lines that do not function according to specification due to manufacturing process variances or low-quality results from a packaging process. The redundant pins can reduce yield loss. One redundant pin is allocated for use as a redundant mainband clock line 444*a*, four redundant pins are allocated for transmission of redundant mainband data lines 444*b* and one redundant pin is allocated for use as a redundant valid line 448.

The mainband receiver PHY circuit 414 in the first die 402 is coupled to the primary mainband data bus 442*a* over which it can receive up to 64-bit parallel data according to timing provided by one or more of the two mainband clock signals received over the mainband clock lines 432*b* from the mainband transmitter PHY circuit 418 in the second die 404. The mainband receiver PHY circuit 414 in the first die 402 may receive a mainband valid signal over the mainband valid line 446*a* that indicates framing information associated with transmitted data and a track signal over the track line 446*b* to enable correction or adjustment of phase in the two mainband clock signals received over the mainband clock lines 432*b*. The mainband receiver PHY circuit 414 is further coupled to a further six redundant pins of the first die 402. One redundant pin may be allocated for receiving the redundant mainband clock line 444*a*, four redundant pins are allocated for receiving the redundant mainband data lines 444*b* and one redundant pin is allocated for receiving a framing signal over the redundant valid line 448.

In the illustrated example, the sideband transmitter PHY circuit 422 in the first die 402 is coupled to a sideband data line 452*a* over which it can transmit data according to timing provided by a sideband clock signal that is transmitted over a sideband clock line 452*b* by the sideband transmitter PHY circuit 422. The sideband transmitter PHY circuit 422 in the first die 402 may be configured to transmit over a redundant sideband data line 454*a* and a redundant sideband clock line 454*b*. The sideband receiver PHY circuit 426 in the second die 404 is coupled to the sideband data line 452*a* over which it can receive data according to timing in the sideband clock signal transmitted over the sideband clock line 452*b* by the sideband transmitter PHY circuit 422 in the first die 402. The sideband receiver PHY circuit 426 in the second die 404 may be configured to receive signals over the redundant sideband data line 454*a* and the redundant sideband clock line 454*b*. The sideband transmitter PHY circuit 428 in the second die 404 is coupled to a sideband data line 462*a* over which it can transmit data according to timing provided by a sideband clock signal transmitted over the sideband clock line 462*b*. The sideband transmitter PHY circuit 428 in the second die 404 may transmit a redundant sideband data signal over a redundant sideband data line 464*a* and a redundant sideband clock signal over a redundant sideband clock line 464*b*. The sideband receiver PHY circuit 424 in the first die 402 is coupled to the sideband data line 462*a* over which it can receive data according to timing in the sideband clock signal received over the sideband clock line 462*b* and provided by the sideband transmitter PHY circuit 428 in the second die 404. The sideband receiver PHY circuit 424 in the first die 402 may receive redundant sideband data over a redundant sideband data line 464*a* and the redundant sideband clock signal over the redundant sideband clock line 464*b*.

Figure 5:
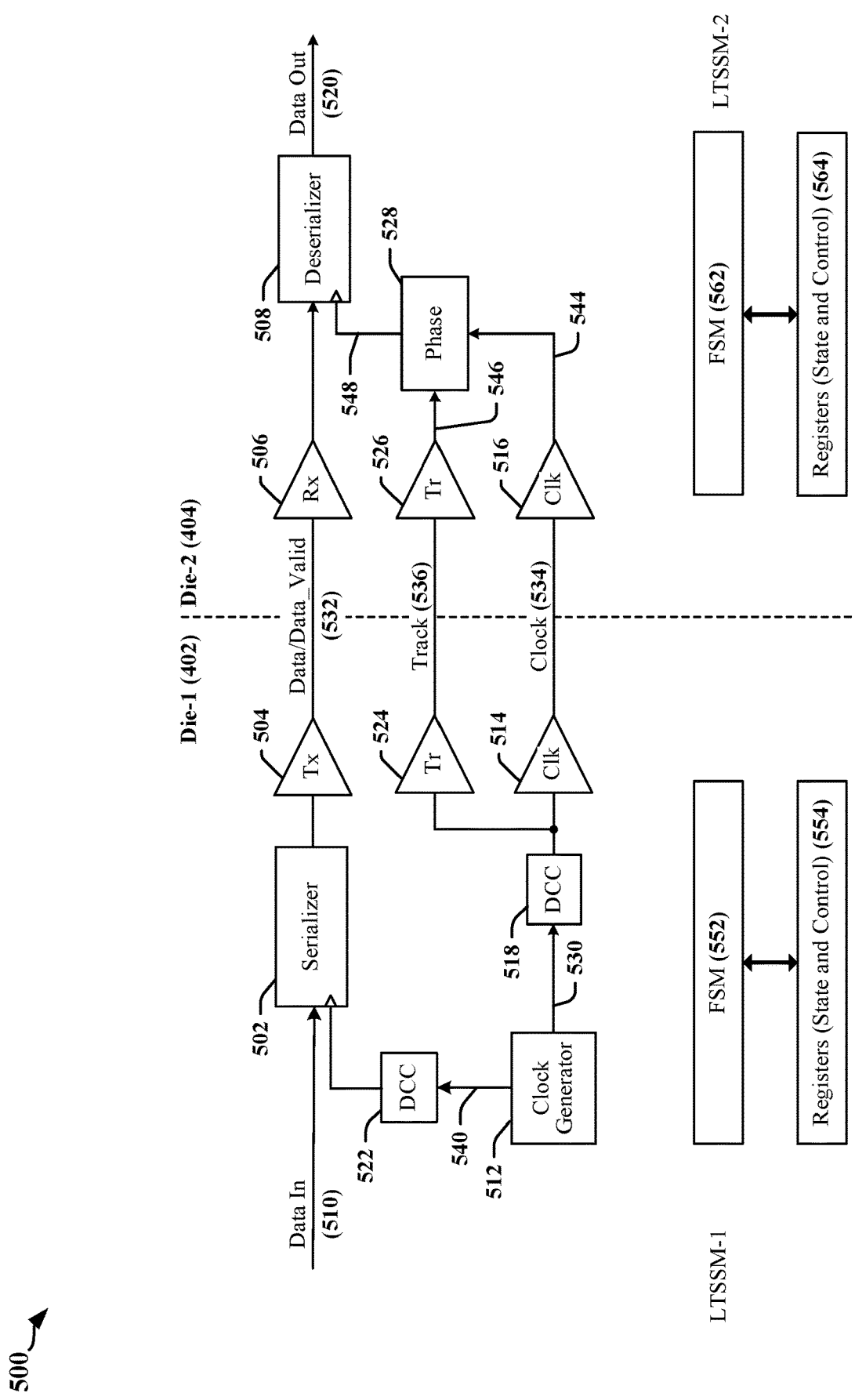
FIG. 5 illustrates and example of data transmission through an advanced packaging option interface configured to operate in accordance with Universal Chiplet Interconnect Express (UCIe) specifications.

FIG. 5 illustrates and example of data transmission through an advanced packaging option interface 500 configured to operate in accordance with UCIe specifications. Certain elements of the circuits illustrated in FIG. 5 are abstracted or summarized. For example, FIG. 5 depicts one data or data valid lane 532 that couples the first die 402 and the second die 404. Multiple data or data valid lanes are typically used. The first die 402 includes a serializer 502 that is configured to receive parallel input data 510. The data stream produced by the serializer 502 is provided to a data line driving circuit 504 that transmits the datastream over the data or data valid lane 532. A data receiving circuit 506 coupled to the data or data valid lane 532 cooperates with a deserializer 508 to sample or capture bits in the received bitstream and provide parallel output data 520.

A clock generator 512 generates one or more clock signals that can be used to serialize the parallel input data 510 and to control data transmission over the data or data valid lane 532. The clock generator 512 provides a first clock signal 530 that is used to control timing of the serializer 502. In certain implementations, data is encoded in a double data rate signal in which each two bits of data are transmitted for each cycle of a transmitted clock signal. For example, the data or data valid lane 532 may be configured for a 16 gigabits per second (Gbps) data rate when the first clock signal 530 has a frequency of 8 GHz. The first clock signal 530 may be coupled to the serializer 502 through a duty cycle correction circuit 522 to ensure that the durations of both half-cycles of the first clock signal 530 are closely matched. The clock generator 512 may provide a second clock signal 540 to a clock line driving circuit 514 that drives the clock lane 534. The second clock signal 540 may be coupled to the clock line driving circuit 514 through a duty cycle correction circuit 518. The output of the duty cycle correction circuit 518 may be provided to a tracking line driving circuit 524, which transmits a version of the clock signal over the track lane 536.

At the receiver, a clock receiving circuit 516 coupled to the clock lane 534 and a track receiving circuit 526 coupled to the track lane 536 provide versions 544, 546 of the second clock signal 540 to a phase correction or alignment circuit 528 that produces a clock signal 548 that us used to clock the deserializer 508.

The example illustrated in FIG. 5 relates to mainband communication in which a framing signal (i.e. a data valid signal) is transmitted over a data or data valid lane 532 and a tracking signal is transmitted over a track lane 536. The circuits and structures illustrated in FIG. 5 correspond in some respects to the sideband communication used to exchange command and control information. Furthermore, the example illustrated in FIG. 5 shows communication from the first die 402 to the second die 404. Similar circuits and structures may be configured to enable mainband or sideband communication from the second die 404 to the first die 402.

An initialization procedure provided by the UCIe specification enables the first die 402 and the second die 404 to establish reliable connections. The initialization procedure defines states that correspond to different phases of link initialization. The participants in the initialization procedure are required to progress through a sequence of states before the link can be declared to be active. The initialization procedure may be managed or controlled in each die by a finite state machine (FSM) or by another controller or processor. In the illustrated example, the FSM 552 in the first die 402 and the FSM 562 in the second die 404 may be configured to operate as link training and status state machines (LTSSMs) in accordance with UCIe specifications. Each of the FSMs 552, 562 may be coupled to one or more control registers 554, 564 that maintain state, configuration and other control information that can be used to control state transitions.

Figure 6:
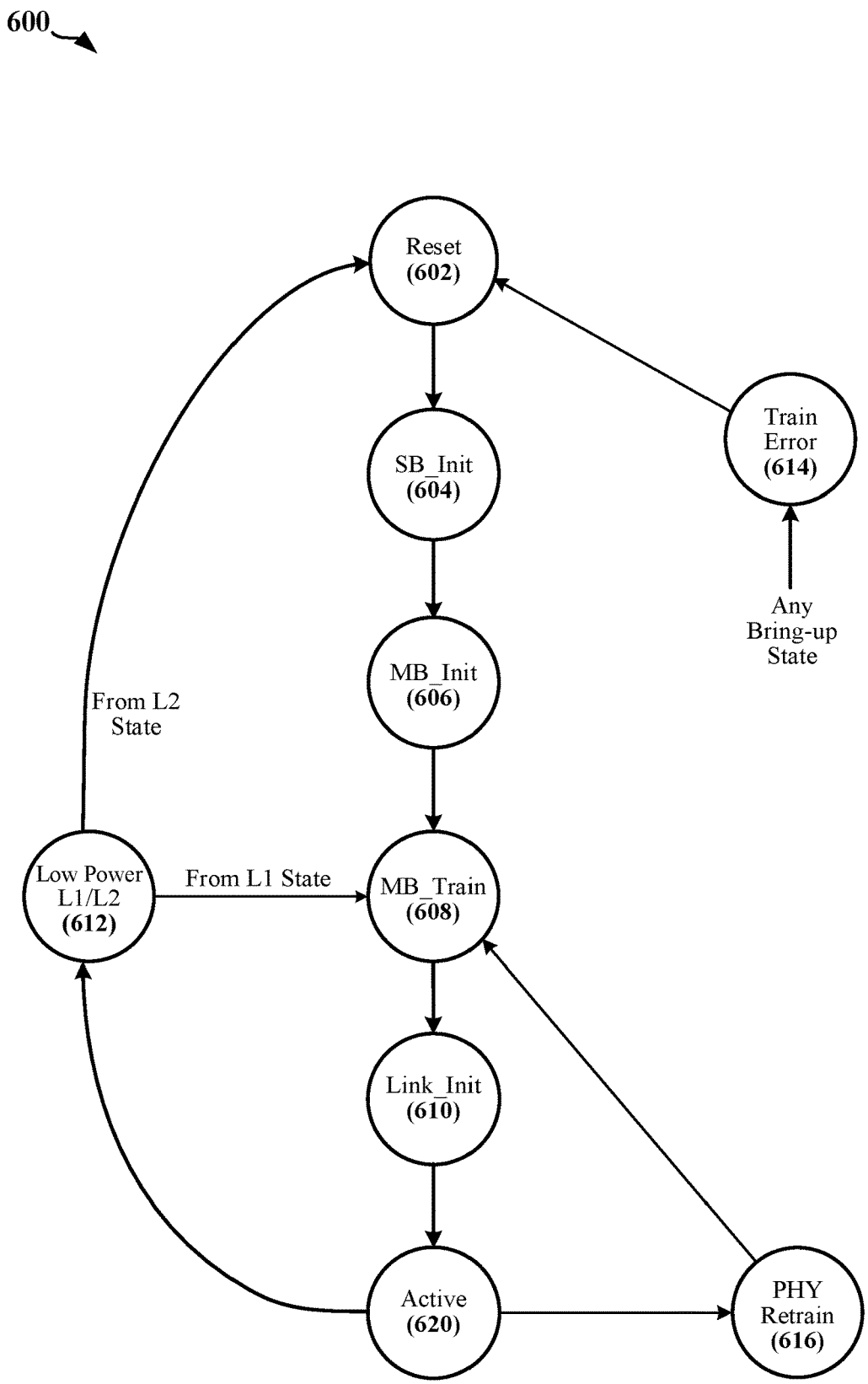
FIG. 6 illustrates an initialization procedure defined by UCIe specifications.

FIG. 6 is a state diagram 600 that illustrates an initialization procedure defined by UCIe specifications. The initialization procedure may be managed or controlled using a processor, microcontroller or an FSM 552, 562 configured to implement an LTSSM in accordance with UCIe specifications. The LTSSM may be initially in a reset state 602 before entering the sideband initialization state 604. The reset state 602 may be entered following a system reset or after detecting an error during operation, including link training operations. The sideband initialization state 604 is used to establish reliable control and command communications over the lower-frequency sideband link. The participants in the initialization procedure are required to test all combinations of lines that include a data line and a clock line. In one example, the combinations tested include: the sideband data line 452*a* and the sideband clock line 452*b*; the redundant sideband data line 454*a* and the redundant sideband clock line 454*b*; the sideband data line 452*a* and the redundant sideband clock line 454*b*; and the redundant sideband data line 454*a* and sideband clock line 452*b*. If, during testing, data transmission is unsuccessful using the sideband data line 452*a* and sideband clock line 452*b*, then the link may be established using another combination of clock and data lines.

Sideband initialization testing may include transmission and detection of one or more training patterns. In one example, a training pattern may include a transmission of data in 64 data bit transmission intervals and driving data lines low for 32 data bit transmission intervals. Data bit transmission intervals may correspond to one clock cycle and may be referred to as unit intervals (UIs). The duration of a UI defines the minimum time between transitions in signaling state of a data signal. The training patterns are conventionally transmitted over all combinations of the redundant lines. For example, the sideband transmitter PHY circuit 422 transmits the training pattern over all possible clock-plus-data combinations of the sideband data line 452*a*, sideband clock line 452*b*, the redundant sideband data line 454*a* and the redundant sideband clock line 454*b*.

When the sideband link has been initiated and is functional, the initialization procedure proceeds to a mainband initialization state 606. In certain implementations, each of the participants in the initialization procedure may test the combination of the mainband data bus 432*a*, the mainband valid line 436*a*, the track line 436*b* and one or more of the mainband clock lines 432*b*. If data transmission is unsuccessful using the mainband data bus 432*a*, the mainband valid line 436*a*, the track line 436*b* and the mainband clock lines 432*b*, then the link may be established using the redundant mainband clock line 434*a*, one or more of the redundant mainband data lines 434*b*, and/or the redundant valid line 438. The participants in the initialization procedure may test the combination of the primary mainband data bus 442*a*, mainband valid line 446*a*, track line 446*b* and primary mainband clock lines 442*b*. If data transmission is unsuccessful using the primary mainband data bus 442*a*, mainband valid line 446*a*, track line 446*b* and mainband clock lines 442*b*, then the link may be established using the redundant mainband clock line 444*a*, one or more of the redundant mainband data lines 444*b*, and/or the redundant valid line 448.

When the mainband link has been tested and repaired where necessary, the initialization procedure proceeds to a mainband training state 608. The mainband training state 608 is used to configure and calibrate the PHY circuits 412, 414, 416, 418. In some implementations, a maximum speed of operation is configured and each transmit/receive pair of PHY circuits 412/416 or 414/418 cooperate to perform die-to-die training. The maximum speed of operation may correspond to a negotiated data rate. In one example, die-to-die training may be performed to center one or more clock signals with respect to data signals. Calibration may include calibrating the clock generator 512, the duty cycle control circuits 518, 522, line driving circuits 504, 514, 524, receiving circuits 506, 516, 526 and phase correction or alignment circuit 528. In one example, the clock generator 512 may be calibrated to tune the frequency of the clock signals 530, 540. In another example, the duty cycle control circuits 518, 522 may be calibrated to optimize timing of the clock signals provided to the serializer 502 and line driving circuits 514, 524. In another example, equalizers in the line driving circuits 504, 514, 524 and receiving circuits 506, 516, 526 may be calibrated to accommodate or compensate for transmission errors.

A failure to successfully complete initialization or training in any of the bring-up states 604, 606, 608, 610 causes the participants in the initialization procedure to enter a training error state 614 which ultimately results in reentry to the reset state 602.

When the mainband link has been trained, then the link may be initialized in the link initialization state 610. In the link initialization state 610, messages are exchanged between the two dies 402, 404, using the sideband link 408. In one example, link initialization includes establishing initial communication state, clearing buffers and initializing protocol stacks. When the link is initialized, the active state 620 is entered. In some instances, the communication link may be idled and/or caused to enter a low-power state 612. The low-power state 612 may support multiple levels of low-power operation. For example, an L1 power-down mode may maintain certain subcircuits in the PHY circuits 412, 414, 416, 418 in an active, reduced voltage state, while an L2 power-down mode may power down subcircuits in the PHY circuits 412, 414, 416, 418 that are required to maintain calibration of the link. The low-power state 612 is typically entered from the active state 620. Exit from the L1 power-down mode may cause a transition to the mainband training state 608 in order to reconfigure or recalibrate the PHY circuits 412, 414, 416, 418. Exit from the L2 power-down mode may cause a transition to the reset state 602.

Either device coupled to the communication link may cause entry to a PHY retraining state 616. The PHY retraining state 616 may be entered when an error is detected in data transmissions over the mainband data bus 432a. The initialization procedure may be re-entered through the mainband training state 608 in order to reconfigure or recalibrate the PHY circuits 412, 414, 416, 418.

Conventional UCIe initialization procedures require testing of all combinations of the sideband data line 452a, sideband clock line 452b, the redundant sideband data line 454a and the redundant sideband clock line 454b by transmitting and detecting a prolonged training pattern for each combination. The PHY circuit 426 samples and validates a training pattern received over the first sideband data line 452a using the clock signal received over the first sideband clock line 452b and also samples and validates a training pattern received by the first sideband data line 452a using the clock signal received over the second sideband clock line 454b. Additionally, the PHY circuit 426 samples and validates a training pattern received by the second sideband data line 454a using the clock signal received over the first sideband clock line 452b and also samples and validates a training pattern received by the second sideband data line 454a using the clock signal received over the second sideband clock line 454b. The PHY circuit 424 samples and validates a training pattern received by the third sideband data line 462a using the clock signal received over the third sideband clock line 462b and also samples and validates a training pattern received by the third sideband data line 462a using the clock signal received over the fourth sideband clock line 464b. Additionally, the PHY circuit 424 samples and validates a training pattern received by the fourth sideband data line 464a using the clock signal received over the third sideband clock line 462b and also samples and validates a training pattern received by the fourth sideband data line 464a using the clock signal received over the fourth sideband clock line 464b. It will be appreciated that a minimum of 8 training patterns are required to test all combinations of clock and data lines for both directions of transmission in the sideband link.

In some systems, it may be necessary or desirable to provide data communication links that exceed 64 read lines and/or 64 write lines. Certain UCIe specifications define a multi-module PHY logic (MMPL) architecture and associated procedures that provide inter-die communication links built on multiple link modules 400. The link modules 400 are initialized and trained independently. The mainband training state 608 (see FIG. 6) is configured to wait for completion of training procedures for all configured link modules 400 before the configured link modules are bound according to MMPL specifications during the link initialization state 610. Binding link modules 400 may include combining the data lanes and associated control signals into a block of data lanes from which individual data lanes or groups of data lanes may be assigned for usage defined by an application. Binding link modules 400 may further include assigning one sideband link to transmit and receive communication link status and control messages for all bound link modules 400.

In the example illustrated in FIG. 4, each link module 400 includes a mainband link 406 that provides a bidirectional mainband data width of 64 bits with associated clock, valid and track signals. Each link module 400 includes a physical sideband link 408 configured as illustrated in FIG. 4. According to UCIe specifications for MMPL, one logical sideband link is defined for bound link modules 400 and is used to carry all die-to-die sideband messages. The logical sideband link is typically mapped to the physical sideband link 408 in the link module 400 that provides the least significant bit data lane. Link modules 400 that are bound according to UCIe specifications for MMPL may be assigned logical numbers, with Module-0 providing the least significant bit data lane.

Figure 7:
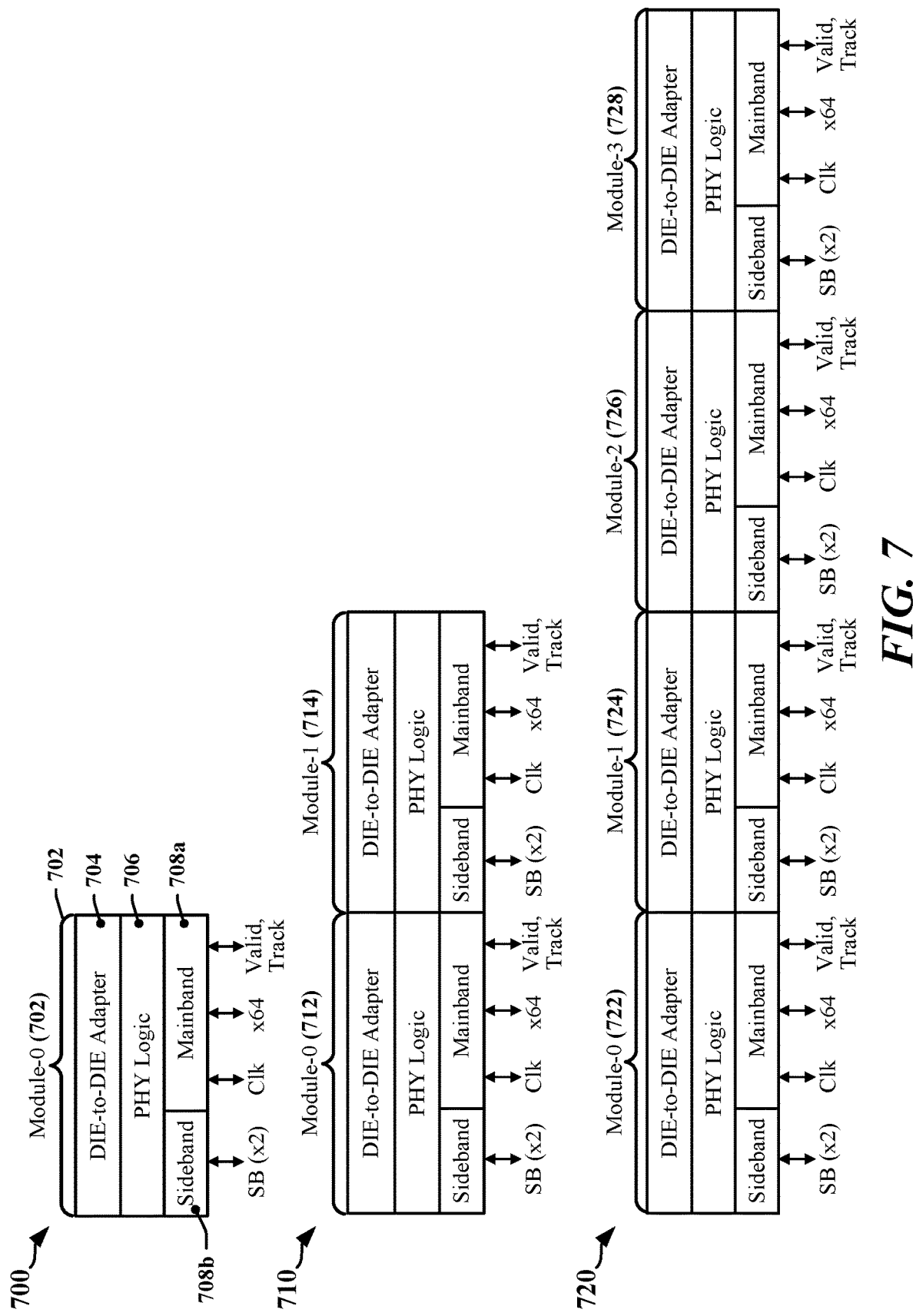
FIG. 7 illustrates inter-die communication links configured in accordance with UCIe specifications.

FIG. 7 illustrates examples of inter-die communication links 700, 710, 720 configured in accordance with UCIe specifications. The first inter-die communication link 700 features a single link module 702 that corresponds in many respects to the link module 400 illustrated in FIG. 4. The link module 702 includes multiple layers of hardware and software modules, including a die-to-die adaption layer 704 that may be configured to manage inter-die communication, physical layer (PHY) logic 706 that controls and manages the electrical characteristics of analog front-end circuits and the configuration of logic circuits used to transmit or receive over the mainband link 708a and/or the sideband link 708b. The first inter-die communication link 700 provides a nominal 64-bit mainband data path in both transmit and receive directions. The second inter-die communication link 710 includes two link modules 712, 714, each of which correspond to the link module 702 and/or to the link module 400 illustrated in FIG. 4. The second inter-die communication link 710 provides a nominal 128-bit mainband data path in both transmit and receive directions. The third inter-die communication link 720 includes four link modules 722, 724, 726, 728, each of which correspond to the link module 702 and/or to the link module 400 illustrated in FIG. 4. The second inter-die communication link 720 provides a nominal 256-bit mainband data path in both transmit and receive directions. It can be expected that certain applications or systems may not transmit or receive over every mainband data line provided by an inter-die communication link 700, 710, 720.

In systems that are configured to bind two link modules 712, 714, four link modules 722, 724, 726, 728 or any other number of link modules, each link module 712, 714, 722, 724, 726, 728 is initialized and trained independently. In some implementations, the final configuration of a multi-module link is determined in the mainband training state 608 (see FIG. 6) based on the number an identity of link modules 712, 714, 722, 724, 726, 728 that have been successfully trained. In the example of the second inter-die communication link 710, the two link modules 712, 714 may be bound according to MMPL specifications in the link initialization state 610 when both link modules 712, 714 have been successfully trained. When a persistent error occurs during training of either link module 712, 714, a 64-bit link may be configured using the link module 712, 714 that was successfully trained.

In the example of the third inter-die communication link 720, the four link modules 722, 724, 726, 728 may be bound to provide a 256-bit link according to MMPL specifications during the link initialization state 610 when all link modules 722, 724, 726, 728 have been successfully trained. MMPL specifications provide that a 128-bit link may be configured using two link modules 722, 724, 726 and/or 728 that were successfully trained when a persistent error occurs during training of one or two of the link modules 722, 724, 726 and/or 728. MMPL specifications also provide that a 64-bit link can be configured when only one of the link modules 722, 724, 726 or 728 is successfully trained.

Figure 8:
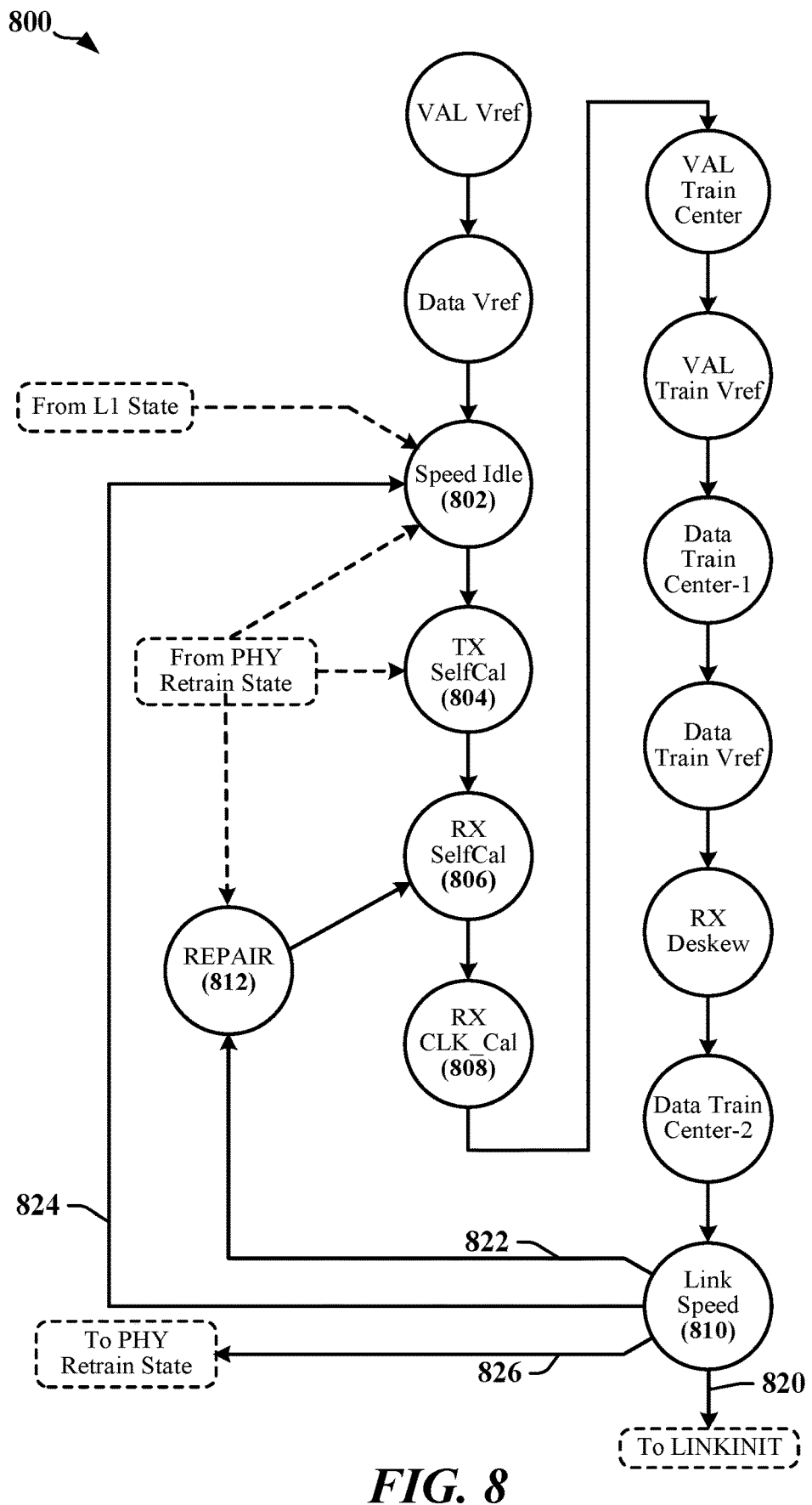
FIG. 8 illustrates an example of mainband training within the mainband training state illustrated in FIG. 6.

FIG. 8 is a state diagram 800 that illustrates an example of mainband training within the mainband training state 608 illustrated in FIG. 6. A Speed Idle state 802 is entered from a power-down state 612 and/or after circuits associated with data and valid lanes have been configured or trained. The data rate and frequency of associated clock signals may be configured for all link modules in the Speed Idle state 802.

The training procedure then transitions to a transmitter calibration state 804 followed by a receiver calibration state 806 in which each link module calibrates its own physical layer circuits. The receive clock calibration state 808 follows in which edges of one or more clock signals in a receiving link module are calibrated with a clock signal transmitted over a clock lane by a transmitting link module. Timing of sampling signals for data and valid signals may then be performed. The results of the training are assessed in the Link Speed state 810. When all link modules have been successfully trained, a transition 820 from the mainband training state 608 to the link initialization state 610 may be executed. Certain errors reported during training may be correctable, in which case a transition 822 to a PHY repair state 812 permits a link module to reconfigure its physical circuits and renter the training procedure, at the receiver calibration state 806 for example. Certain errors reported during training may be persistent or sufficiently serious that link data rate and frequency of associated clock signals may be reconfigured for all link modules. A transition 824 to the Speed Idle state 802 restarts certain aspects of training for all link modules at the newly reconfigured link data rate and clock frequency. In some instances, a transition 826 to the PHY retraining state 616 may be initiated when failures recur after one or more reconfigurations of link data rate and clock frequency.

Figure 9:
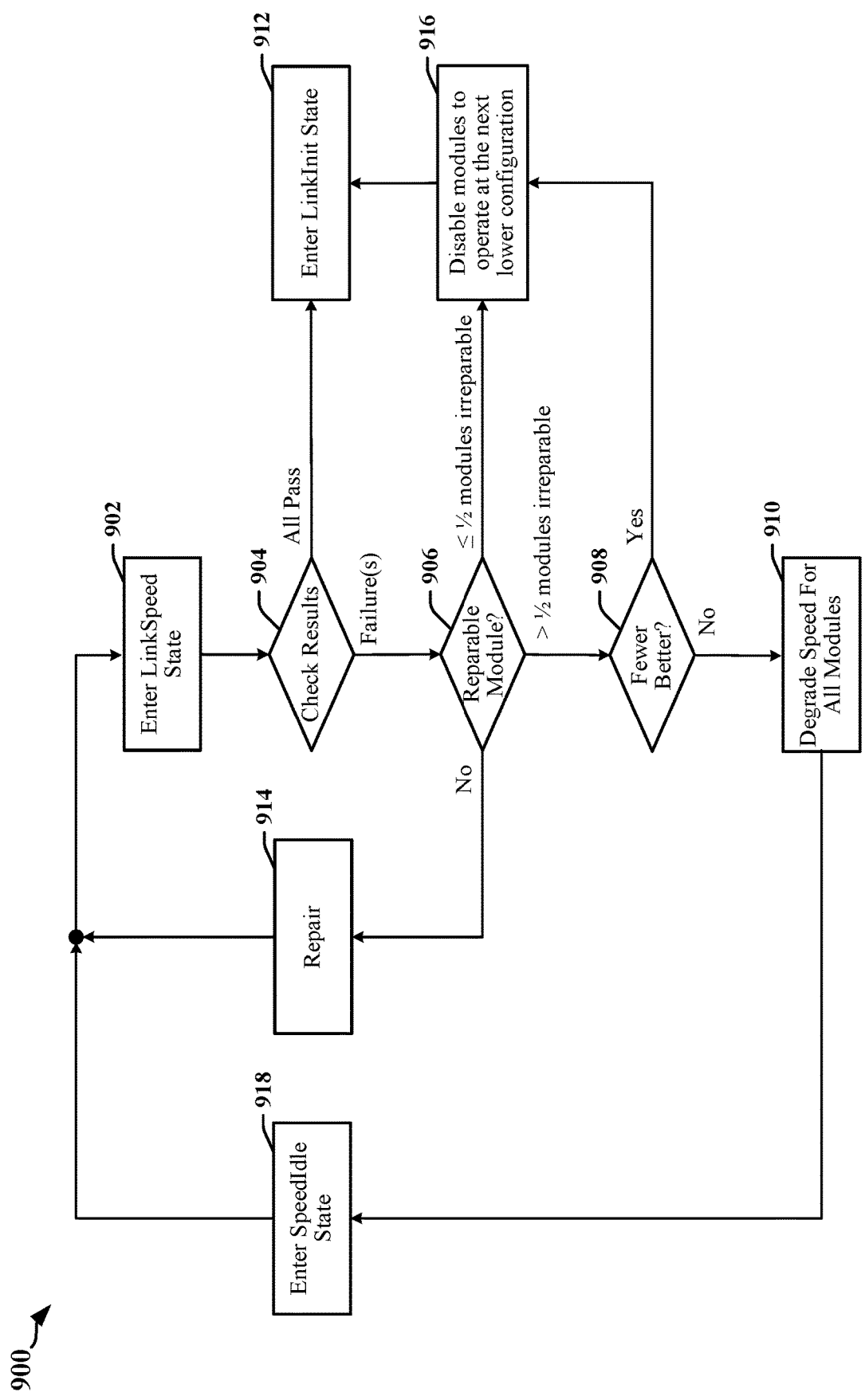
FIG. 9 is a decision flow chart that illustrates certain decision points and transitions encountered in mainband training.

FIG. 9 is a decision flow chart 900 that illustrates certain decision points and transitions encountered during mainband training. At block 902, entry is made to Link Speed state 810 which causes all link modules to be trained according to a defined data rate and frequency of associated clock signals. If at block 904, the results of training indicate that all link modules have been successfully trained, then the link initialization state 610 may be entered at block 912. If at block 904, the results of training indicate that one or more link modules have reported unresolved errors during training, then the decision process proceeds to block 906.

At block 906, it may be determined whether one or more link modules are deemed to be irreparable at the current clock frequency. If at block 906 the results of training indicate that half or more of the modules have been successfully trained, then the decision may be taken to reduce the number of link modules to be configured at block 916 before entering the link initialization state 610 at block 912. Reducing the number of link modules to be configured in a multimodule link may be referred to herein as downgrading the multimodule link configuration. The reduced number of modules may be bound according to UCIe specifications for MMPL in the link initialization state 610. In some instances, fewer than half of the modules have been successfully trained and the PHY repair state 812 may be entered at block 914. After repair, the Link Speed state 810 may be entered at block 902.

In some instances, one or more modules may report successful training with degraded speed. In these instances, it may be determined at block 908 whether better performance (e.g., better data throughput) can be obtained from a smaller number of link modules operating at the highest degraded speed than from all of the configured link modules when operating at a lowest degraded speed. If it is determined at block 908 that fewer modules are preferable, then the decision may be taken to reduce the number of link modules to be configured at block 916 before entering the link initialization state 610 at block 912. The reduced number of modules may be bound according to UCIe specifications for MMPL in the link initialization state 610. If it is determined at block 908 that fewer modules are not preferable, then the data rate and clock frequency may be reduced for all link modules at block 910 before the Speed Idle state 802 is entered at block 918 before reentry to the Link Speed state 810 at block 902.

According to certain UCIe specifications, training is performed in parallel and independently on all mainband links 406 using associated sideband links 408. After successful training, the mainband links 406 may be bound in the link initialization state 610 to provide a multimodule link according to UCIe specifications for MMPL. One sideband link 408 is used to carry link status and control message for all segments of the multimodule link. UCIe specifications define procedures for handling link errors during normal operation of the multimodule link.

Figure 10:
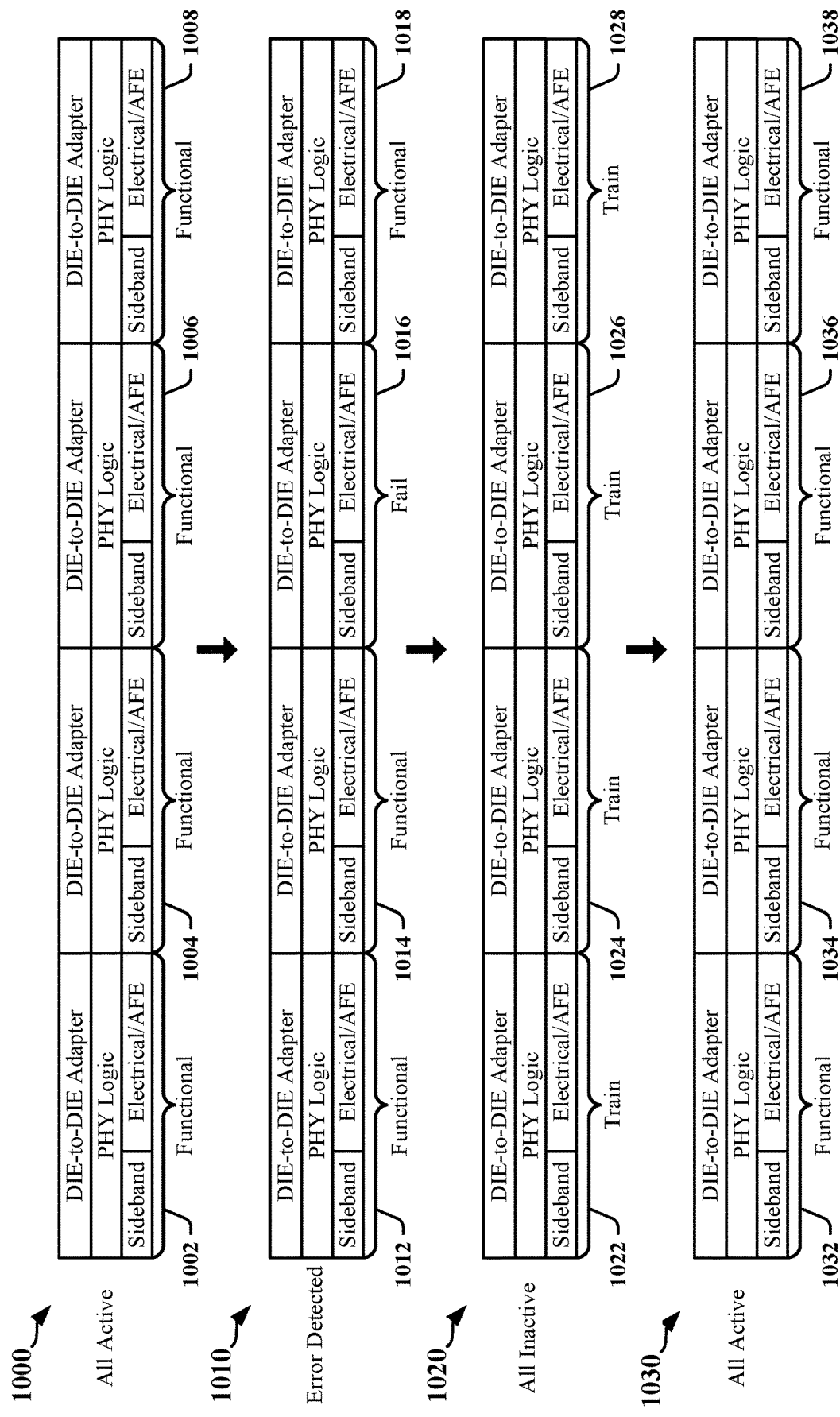
FIG. 10 illustrates certain aspects of link error handling in a multimodule link that uses four link modules to provide data lanes.

FIG. 10 illustrates certain aspects of link error handling in a multimodule link that uses four link modules to provide 256 data lanes. At a first point in time 1000, the multimodule link is operating without error and all link modules 1002, 1004, 1006, 1008 are active and available for transmitting or receiving data. At a second point in time 1010, one link module 1016 has failed due to an unresolvable error condition, while the other three link modules 1012, 1014, 1018 are unaffected by errors and are, at least temporarily, available for transmitting or receiving data. According to certain UCIe specifications, the complete multimodule link is retrained and/or repaired. Consequently, at a third point in time 1020, all link modules 1022, 1024, 1026, 1028 have entered a retraining or repair state after determining that link module 1016 has failed. All link modules 1022, 1024, 1026, 1028 are inactive and unavailable for transmitting or receiving data. At a fourth point in time 1030, after a successful retraining process, the multimodule link is operating without error and all link modules 1032, 1034, 1036, 1038 are returned to an active state and are available for transmitting or receiving data.

Figure 11:
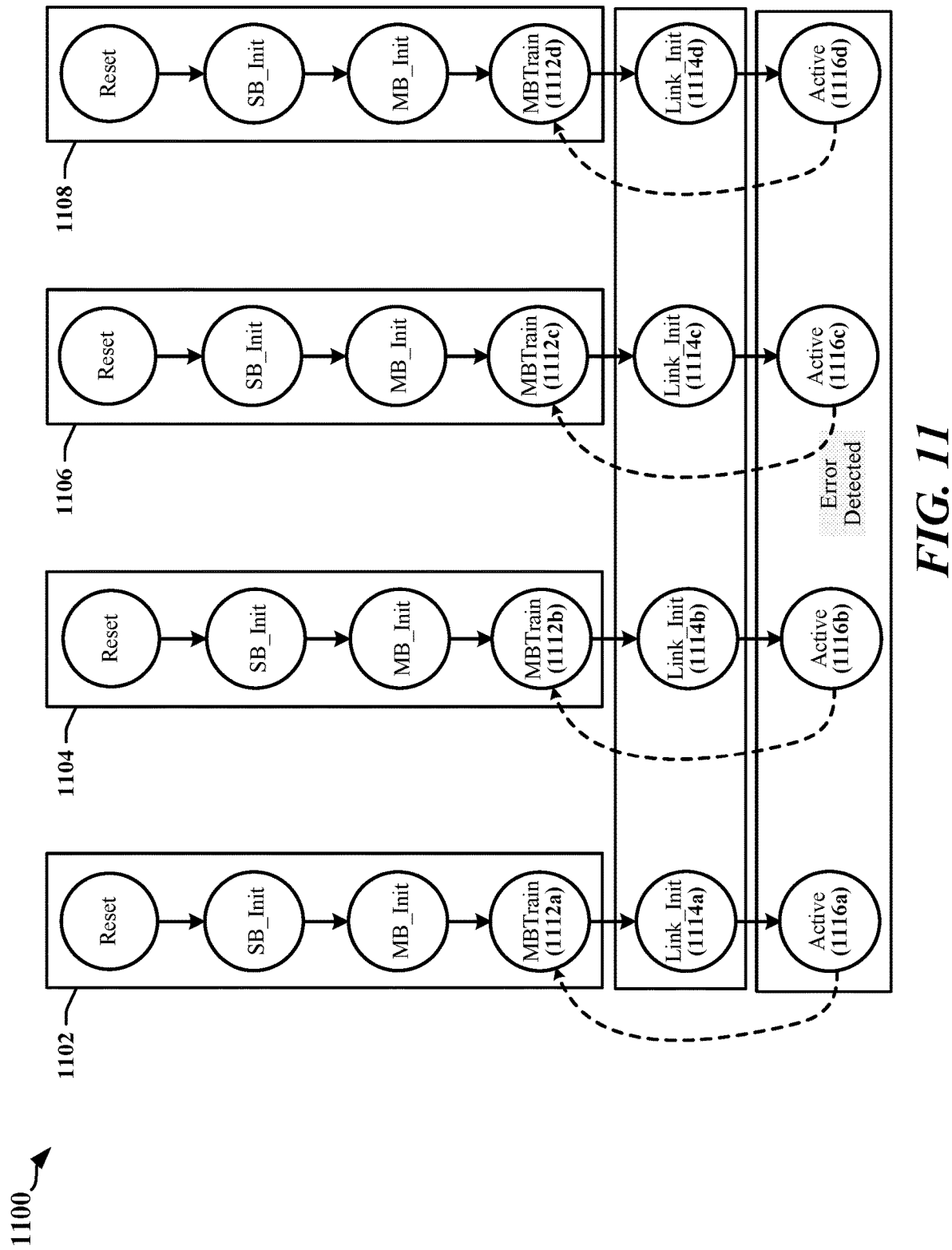
FIG. 11 is a state diagram that illustrates certain aspects of retraining defined by UCIe specifications for a multimodule link.

FIG. 11 is a state diagram 1100 that illustrates certain aspects of retraining defined by UCIe specifications for a multimodule link that uses four link modules 1102, 1104, 1106, 1108 to provide 256 data lanes. The link modules 1102, 1104, 1106, 1108 may each be in an active state 1116a, 1116b, 1116c, 1116d and available for transmitting or receiving data when an error detected on one link module 1106 causes the link module 1106 to fail. According to certain UCIe specifications, the complete multimodule link is retrained and/or repaired in response to the detection of an error affecting a single link module 1106. All link modules 1102, 1104, 1106, 1108 transition to corresponding mainband training states 1112a, 1112b, 1112c, 1112d. When all of the link modules 1102, 1104, 1106, 1108 have reported successful training, the link modules 1102, 1104, 1106, 1108 transition to their corresponding link initialization states 1114a, 1114b, 1114c, 1114d. The link modules 1102, 1104, 1106, 1108 may be bound according to UCIe specifications for MMPL in the link initialization states 1114a, 1114b, 1114c, 1114d before the link modules 1102, 1104, 1106, 1108 return to the active state 1116a, 1116b, 1116c, 1116d and the multimodule link becomes available for transmitting or receiving data.

Figure 12:
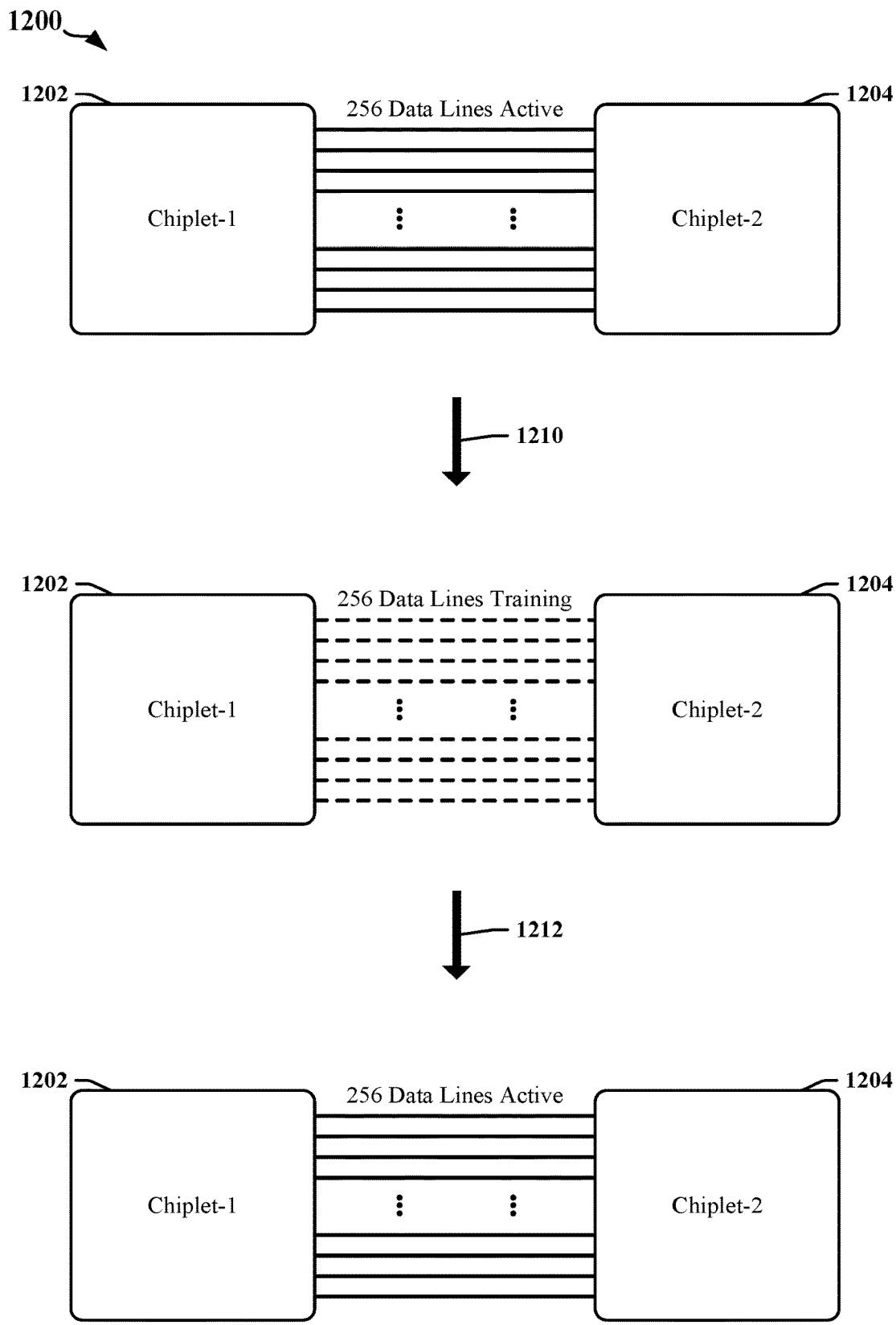
FIG. 12 is diagram that illustrates the effect on multimodule link availability for inter-chiplet communication.

FIG. 12 is diagram 1200 that illustrates the effect on multimodule link availability for inter-chiplet communication when conventional UCIe specifications govern retraining after failure of one or more link module. In the illustrated example, two chiplets 1202, 1204 are coupled through a multimodule link that uses four link modules to provide 256 data lanes. An error event 1210 affecting one link module may trigger a fault condition that renders all 256 data lanes inoperative while retraining is performed. When completion of retraining is indicated 1212, the multimodule link may become fully active with 256 data lanes available for transmitting or receiving data.

In conventional systems, the multimodule link provides zero bandwidth during retraining. Retraining involves transmitting various different training patterns, which can cause the multimodule link to be inactive for prolonged periods of time and which can consume significant power. Latencies associated with retraining and increased power consumption are attributable to retraining functional link modules and the retraining may be considered both redundant and inefficient. Certain applications may be unable to tolerate complete loss of communication over the multimodule link during retraining. In one example, certain vehicle management systems require communication link availability at all times, particularly when the vehicle is being operated autonomously. Systems requiring high-availability communication links include systems that manage, control or respond to location sensors or cameras, systems that manage, control or respond to vehicle positioning and systems that manage, control or respond to vehicle drivetrain, braking, etc.

Certain aspects of this disclosure can provide high-availability communication links that continue to actively transmit and receive data while repairing or retraining one or more link modules in a multimodule link. The high-availability communication links can support inter-chiplet communication for advanced packaging options defined by UCIe specifications. Communication can be sustained through failure events affecting mainband or sideband links in a link module and can be maintained while the mainband or sideband is repaired and/or retrained.

In certain implementations, multimodule link configuration may be downgraded by excluding a failed link module and one or more other link modules until the failed link module has been repaired and/or retrained. In one example, link modules that have failed may be retrained at a data rate and frequency of associated clock signals defined for all link modules in the Link Speed state 810. When the failed link module has been retrained, all of the link modules may enter a link initialization state to enable the multimodule link configuration to be upgraded. Increasing the number of link modules to be configured in a multimodule link may be referred to herein as upgrading the multimodule link configuration.

Figure 13:
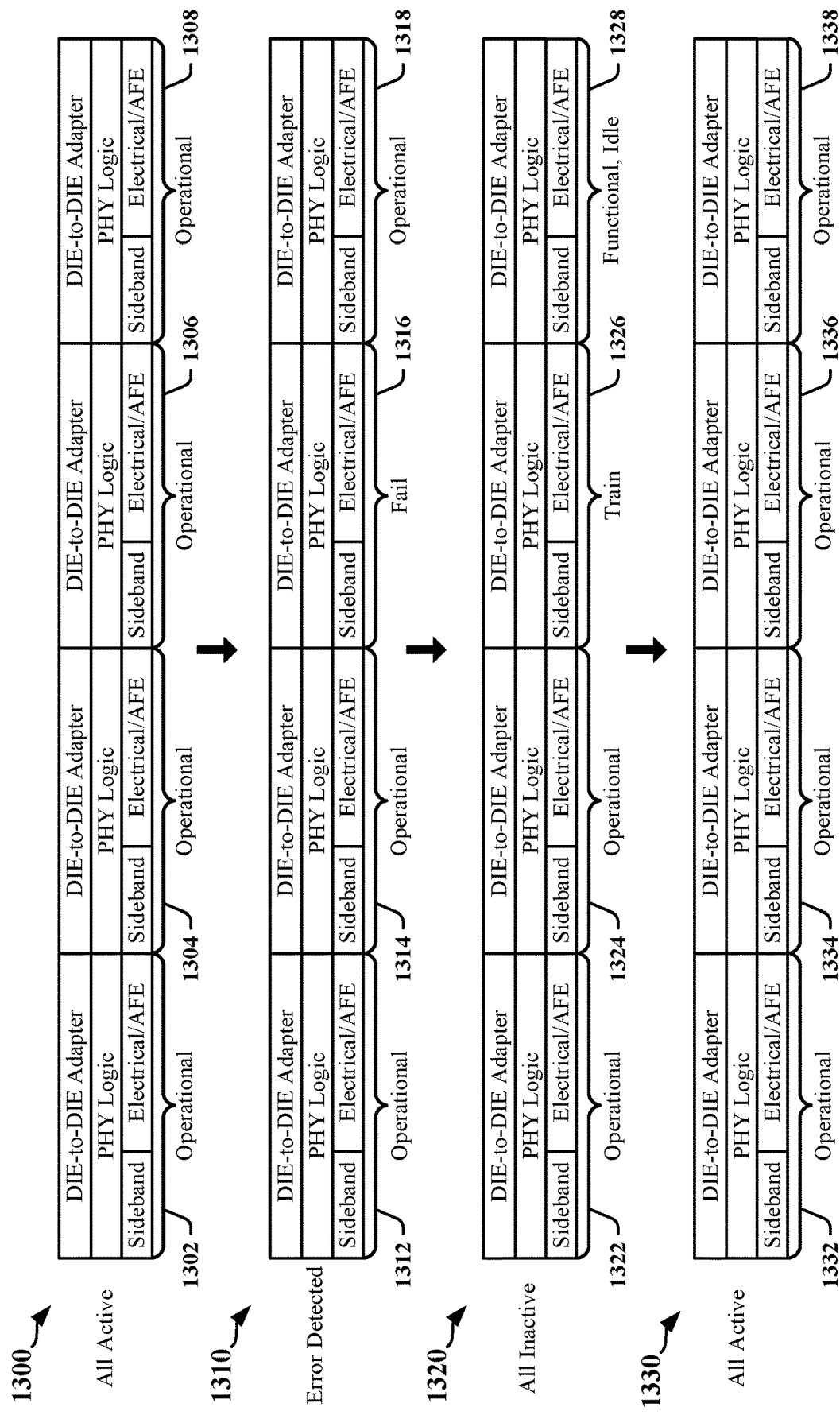
FIG. 13 illustrates certain aspects of a link error handling scheme for a multimodule inter-die communication link that may be implemented in accordance with certain aspects of this disclosure.

FIG. 13 illustrates certain aspects of a link error handling scheme for a multimodule inter-die communication link that may be implemented in accordance with certain aspects of this disclosure. The illustrated example relates to a system that includes two chiplets, each chiplet including four link modules that are configured according to UCIe specifications to provide 256 data lanes in each direction (i.e., transmit and receive). At a first point in time 1300, the multimodule link is operating without error and all link modules 1302, 1304, 1306, 1308 are active and available for transmitting or receiving data. At a second point in time 1310, one link module 1316 has failed due to an unresolvable error condition, while the other three link modules 1302, 1304, 1308 are unaffected by errors and remain available for transmitting or receiving data.

According to certain aspects of this disclosure, a multimodule communication link may be downgraded to the next supported configuration when one or more failed link modules are being retrained. One or more of the functional link modules 1312, 1314, 1318 may be combined to provide the largest available number of data lanes in a downgraded configuration that is consistent with UCIe specifications. Any of the link modules 1312, 1314 and/or 1318 that are not used in the downgraded configuration may be idled. In the illustrated example, the multimodule communication link can be reconfigured at a third point in time 1320 to exclude the link module 1326 that has failed and that is being repaired or retrained. The multimodule communication link may be reconfigured to exclude one functional link module 1328 in order to obtain a multimodule communication link that provides 128 data lanes consistent with UCIe specifications.

When the link module 1326 that failed has been retrained, all link modules 1322, 1324, 1326, 1328 enter a link initialization state. The link modules 1322, 1324, 1326, 1328 may be bound according to UCIe specifications for MMPL in the link in initialization state before the link modules 1322, 1324, 1326, 1328 are returned to the active state and the multimodule communication link becomes available for transmitting or receiving data. At a fourth point in time 1330, the multimodule communication link is operating without error and all link modules 1332, 1334, 1336, 1338 are operating in an active state and are available for transmitting or receiving data.

Figure 14:
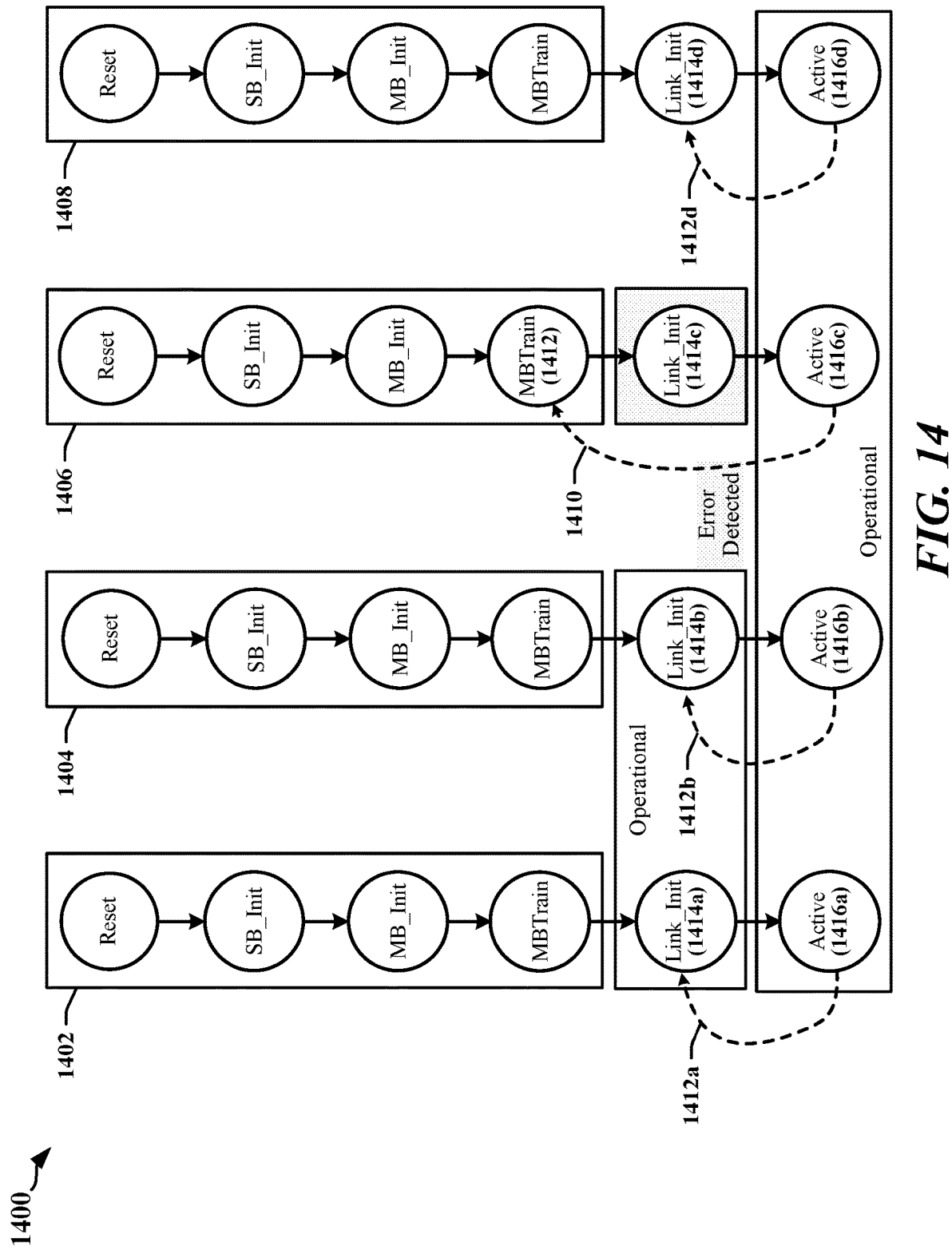
FIG. 14 illustrates certain aspects of a link error handling scheme for a multimodule inter-die communication link that may be implemented in accordance with certain aspects of this disclosure.

FIG. 14 is a state diagram 1400 that illustrates certain aspects of a link error handling scheme for a multimodule inter-die communication link that may be implemented in accordance with certain aspects of this disclosure. The illustrated link error handling scheme is directed to a multimodule communication link that uses four link modules 1402, 1404, 1406, 1408 to provide 256 data lanes when operating nominally. Each of the link modules 1402, 1404, 1406, 1408 may be in an active state 1416a, 1416b, 1416c, 1416d and available for transmitting or receiving data when an error detected on one link module 1406 causes the link module 1406 to fail.

According to certain aspects of this disclosure, retraining and/or repair of the failed link module 1406 may be initiated by a transition 1410 to the mainband training state 1412, while the remaining link modules 1402, 1404, 1408 continue to be active and available for transmitting or receiving data. The multimodule communication link may be downgraded to the next supported UCIe configuration when one or more failed link modules are being retrained. One or more of the remaining link modules 1402, 1404, 1408 may be combined to provide the largest available number of data lanes in a downgraded configuration that is consistent with UCIe specifications. Any of the link modules 1402, 1404 and/or 1408 that are not used in the downgraded configuration may be idled.

When the link module 1406 that failed has been retrained, all link modules 1402, 1404, 1406, 1408 may enter a link initialization state 1414a, 1414b, 1414c, 1414d. The link modules 1402, 1404, 1406, 1408 may be bound according to UCIe specifications for MMPL in the link initialization state 1414a, 1414b, 1414c, 1414d. The resultant multimodule communication link is made available for transmitting or receiving data when the link modules 1402, 1404, 1406, 1408 reenter the active state 1416a, 1416b, 1416c, 1416d.

Figure 15:
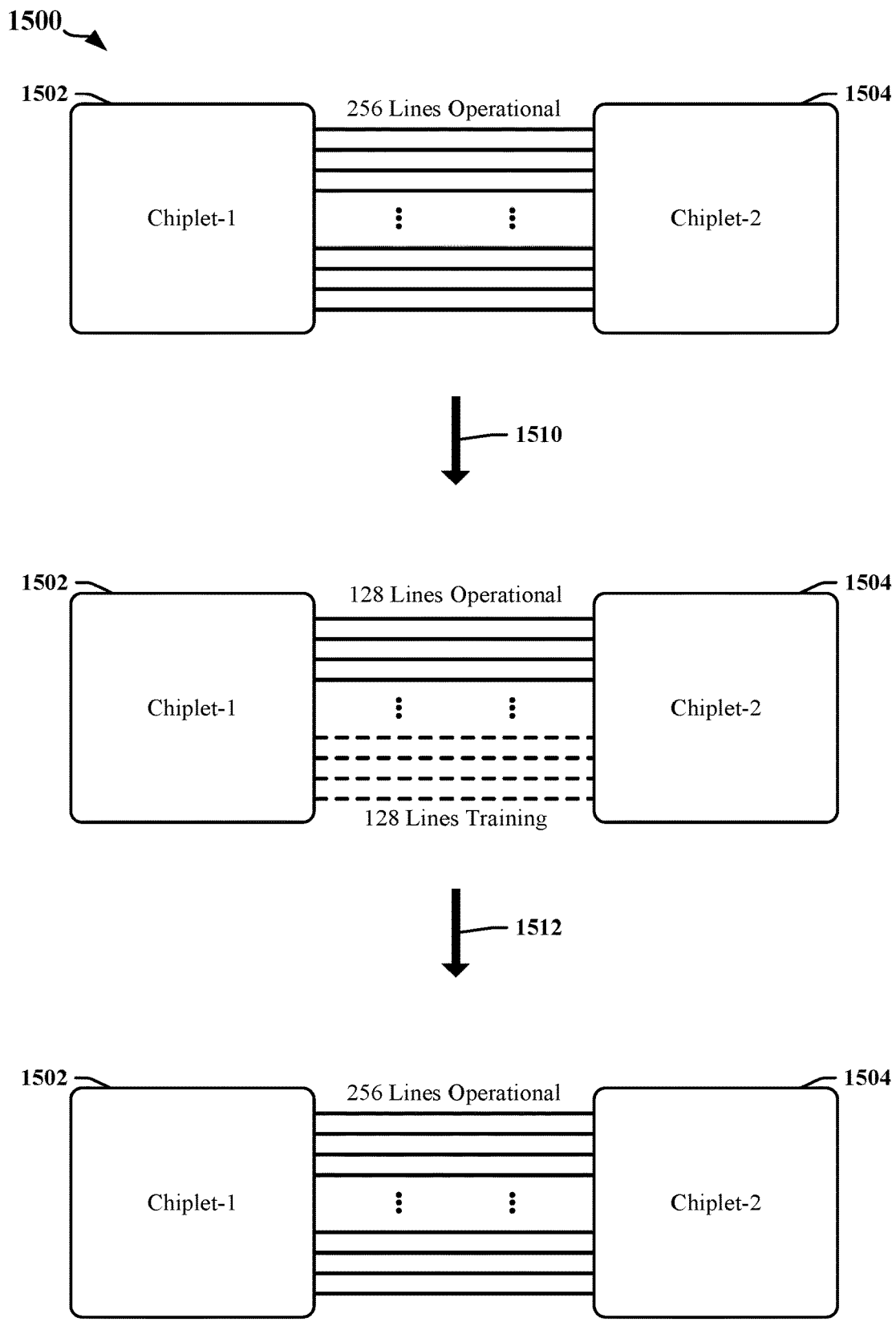
FIG. 15 illustrates effects on availability of an inter-chiplet communication using a link error handling scheme implemented in accordance with certain aspects of this disclosure.

FIG. 15 is diagram 1500 that illustrates the effect of the presently-disclosed link error handling scheme on multimodule link availability for inter-chiplet communication. Two chiplets 1502, 1504 are coupled through a multimodule link that uses four link modules to provide 256 data lanes. An error event 1510 affecting one link module may trigger a fault condition that renders the 64 data lanes provided by the affected link module inoperative while retraining is performed. An additional link module is idled when the multimodule communication link is downgraded to the next supported UCIe configuration, resulting in a loss of a further 64 data lanes. The downgraded multimodule communication link configuration provides 128 data lanes for transmitting data and 128 data lanes for receiving data while the failed link module is being repaired and/or retrained. When the failed link module is repaired and/or retrained 1512, all four link modules can be bound according to UCIe specifications for MMPL to configure a multimodule communication link that provides 256 data lanes for transmitting data and 256 data lanes for receiving data.

As illustrated in FIG. 15, the presently-disclosed link error handling scheme is available for the majority of the time needed to repair and/or retrain one or more failed link modules. A short interruption of communication may be experienced when all link modules have entered a link initialization state after the one or more failed link modules have been successfully repaired and/or retrained.

According to certain aspects of this disclosure, the presently disclosed link error handling scheme may be implemented in a multimodule inter-die communication interface under the control of a processor, microcontroller or a finite state machine. In one example, the link error handling scheme may be implemented using some combination of the FSMs 552, 562 in each die 402, 404 (see FIG. 5), each link module 1402, 1404, 1406, 1408 and/or in each PHY circuits 412, 414, 416, 418 in a link module. In some examples, at least one FSM 552, 562 may be configured to operate as an LTSSM that is compatible or consistent with UCIe specifications.

Two or more FSMs 552, 562 configured to implement the presently disclosed link error handling scheme may communicate using state information maintained in one or more registers, such as the control registers 554, 564 illustrated in FIG. 5. In one example, an 8-bit "MMPL_Link_upgrade" control register may be provided to indicate when all link modules 1402, 1404, 1406, 1408 are required to enter the link initialization state link initialization state 1414a, 1414b, 1414c, 1414d. For example, entry to the link initialization state 1414a, 1414b, 1414c, 1414d may be indicated when a link module 1406 that failed has been retrained and is ready to transition from the training state 1412 to its corresponding the link initialization state 1414c. Active link modules 1402, 1404, 1408 transition from the active state 1416a, 1416b, 1416d to the corresponding link initialization state 1414a, 1414b, 1414d.

Certain aspects of this disclosure can improve aggregate data throughput over a mainband link during retraining procedures. Certain aspects of this disclosure can decrease communication link latencies associated with repair and retraining following an error event affecting one or more link modules. Certain aspects of this disclosure can improve the efficiency of mainband link communications and maximize throughput while optimizing power consumption following detection of an error event affecting one or more link modules. Certain aspects of this disclosure provide a repair and/or retraining scheme that is based on, and is compatible with UCIe specifications.

Figure 16:
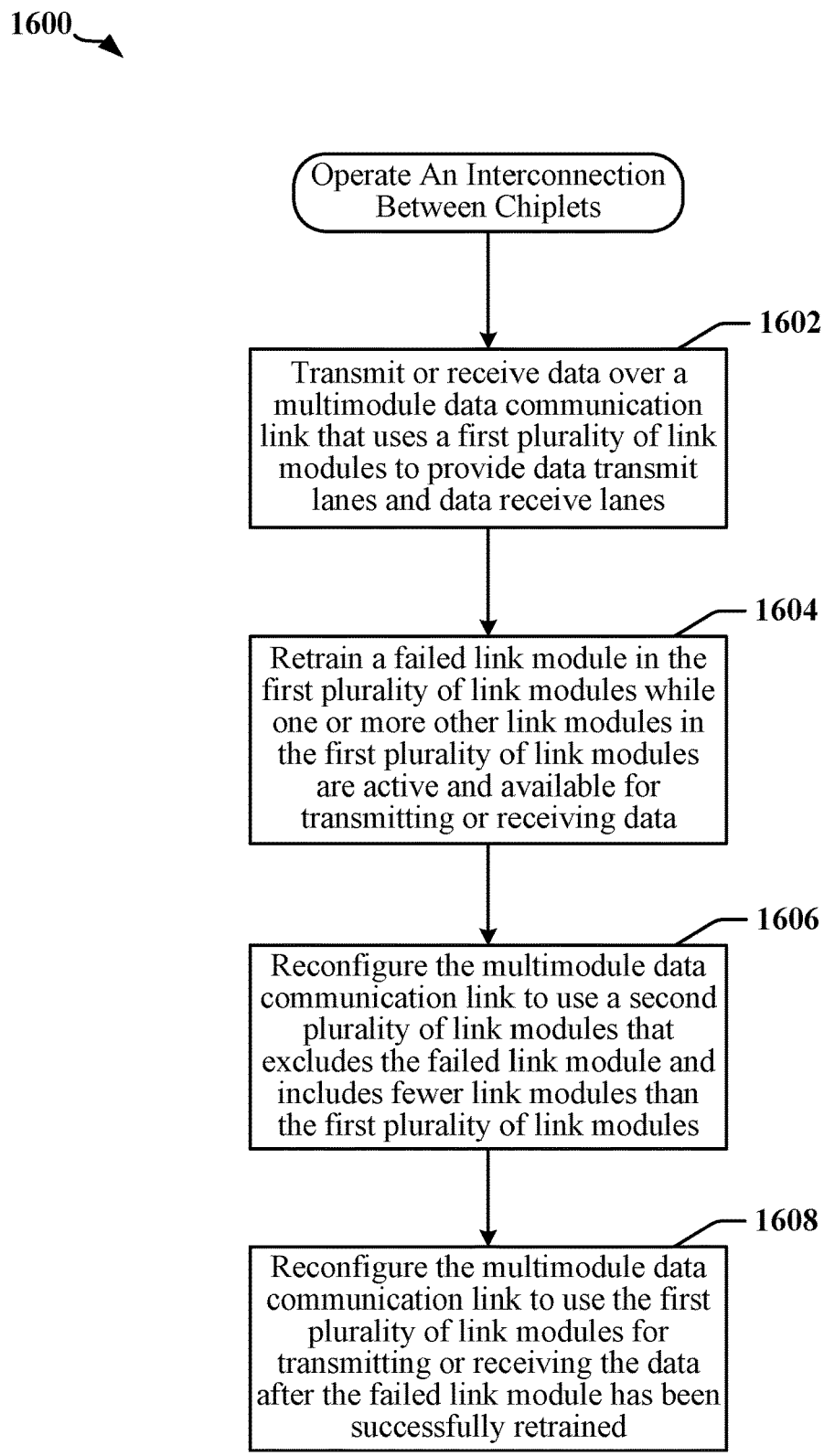
FIG. 16 is a flowchart of a method for operating an interconnection between chiplets in accordance with certain aspects of this disclosure.

FIG. 16 is a flowchart 1600 of a method for operating an interconnection between chiplets in accordance with certain aspects of this disclosure. In some instances, the method is implemented using a processor, a controller, a finite state machine or some combination of processors, controllers and finite state machines.

At block 1602 in the illustrated method, data may be transmitted or received over a multimodule data communication link that uses a first plurality of link modules to provide data transmit lanes and data receive lanes. At block 1604 in the illustrated method, a failed link module in the first plurality of link modules may be retrained while one or more other link modules in the first plurality of link modules are active and available for transmitting or receiving data. At block 1606 in the illustrated method, the multimodule data communication link may be reconfigured to use a second plurality of link modules that excludes the failed link module and includes fewer link modules than the first plurality of link modules. At block 1608 in the illustrated method, the multimodule data communication link may be reconfigured to use the first plurality of link modules for transmitting or receiving the data after the failed link module has been successfully retrained.

In certain implementations, the first plurality of link modules includes a first number of link modules that is defined by UCIe specifications. The second plurality of link modules may include a second number of link modules that is defined by the UCIe specifications. In one example, the second plurality of link modules excludes at least one link module in the first plurality of link modules that is active and available for transmitting or receiving the data. The second plurality of link modules may include a number or quantity of link modules that is defined based on the number of the other link modules in the first plurality of link modules that are active and available for transmitting or receiving data.

In certain implementations, the number of data transmit lanes and data receive lanes provided by each link module may be defined by UCIe specifications. In one example, each link module can be configured to provide 64 data transmit lanes and 64 data receive lanes in accordance with an advanced packaging option defined by the UCIe specifications. In another example, each link module can be configured to provide 16 data transmit lanes and 16 data receive lanes in accordance with a standard packaging option defined by the UCIe specifications.

In certain implementations, a controller or FSM may cause each link module in the first plurality of link modules to enter a link initialization state after the failed link module has been successfully retrained. Each link module in the first plurality of link modules may be bound to the multimodule data communication link in a corresponding link initialization state. A sideband link in one of the first plurality of link modules may be designated to transmit and receive link status and control messages for all bound link modules in the first plurality of link modules. A sideband link in one of the second plurality of link modules may be designated to transmit and receive link status and control messages for all bound link modules in the second plurality of link modules. In some examples, each link module in the first plurality of link modules is bound to the multimodule data communication link in accordance with UCIe specifications. The failed link module may be retrained in accordance with UCIe specifications.

The method illustrated in FIG. 16 may be executed in or using an IC device. The IC device may include multiple semiconductor dice mounted on a substrate. In certain applications, at least one semiconductor die may be stacked on at least one other semiconductor die within an IC package. Each semiconductor die includes at least one circuit block configured to implement a function of the IC device. The IC device may include a controller and a first plurality of link modules configured to provide data transmit lanes and data receive lanes in a multimodule data communication link.

The controller may be configured to retrain a failed link module in the first plurality of link modules while one or more other link modules in the first plurality of link modules are active and available for transmitting or receiving data, reconfigure the multimodule data communication link to use a second plurality of link modules that excludes the failed link module and includes fewer link modules than the first plurality of link modules, and reconfigure the multimodule data communication link to use the first plurality of link modules for transmitting or receiving the data after the failed link module has been successfully retrained.

In certain implementations, the first plurality of link modules includes a first number of link modules that is defined by UCIe specifications. The second plurality of link modules may include a second number of link modules that is defined by the UCIe specifications. In one example, the second plurality of link modules excludes at least one link module in the first plurality of link modules that is active and available for transmitting or receiving the data. The second plurality of link modules may include a number or quantity of link modules that is defined based on the number of the other link modules in the first plurality of link modules that are active and available for transmitting or receiving data.

In certain implementations, the number of data transmit lanes and data receive lanes provided by each link module may be defined by UCIe specifications. In one example, each link module can be configured to provide 64 data transmit lanes and 64 data receive lanes in accordance with an advanced packaging option defined by the UCIe specifications. In another example, each link module can be configured to provide 16 data transmit lanes and 16 data receive lanes in accordance with a standard packaging option defined by the UCIe specifications.

In certain implementations, the controller may be implemented using an FSM. The FSM may be configured to operate as an LTSSM in accordance with UCIe specifications. The FSM may cause each link module in the first plurality of link modules to enter a link initialization state after the failed link module has been successfully retrained. Each link module in the first plurality of link modules may be bound to the multimodule data communication link in a corresponding link initialization state. A sideband link in one of the first plurality of link modules may be designated to transmit and receive link status and control messages for all bound link modules in the first plurality of link modules. A sideband link in one of the second plurality of link modules may be designated to transmit and receive link status and control messages for all bound link modules in the second plurality of link modules. In some examples, each link module in the first plurality of link modules is bound to the multimodule data communication link in accordance with UCIe specifications. The failed link module may be retrained in accordance with UCIe specifications.

In various aspects of the disclosure, a processor-readable storage medium that stores code that, when executed by a processor causes a processing circuit to transmit or receive data over a multimodule data communication link that uses a first plurality of link modules to provide data transmit lanes and data receive lanes, retrain a failed link module in the first plurality of link modules while one or more other link modules in the first plurality of link modules are active and available for transmitting or receiving data, reconfigure the multimodule data communication link to use a second plurality of link modules that excludes the failed link module and includes fewer link modules than the first plurality of link modules, and reconfigure the multimodule data communication link to use the first plurality of link modules for transmitting or receiving the data after the failed link module has been successfully retrained.

In certain implementations, the first plurality of link modules includes a first number of link modules that is defined by UCIe specifications. The second plurality of link modules may include a second number of link modules that is defined by the UCIe specifications. In one example, the second plurality of link modules excludes at least one link module in the first plurality of link modules that is active and available for transmitting or receiving the data. The second plurality of link modules may include a number or quantity of link modules that is defined based on the number of the other link modules in the first plurality of link modules that are active and available for transmitting or receiving data.

In certain implementations, the number of data transmit lanes and data receive lanes provided by each link module may be defined by UCIe specifications. In one example, each link module can be configured to provide 64 data transmit lanes and 64 data receive lanes in accordance with an advanced packaging option defined by the UCIe specifications. In another example, each link module can be configured to provide 16 data transmit lanes and 16 data receive lanes in accordance with a standard packaging option defined by the UCIe specifications.

In certain implementations, the code may further cause the processing circuit to transition each link module in the first plurality of link modules into a link initialization state after the failed link module has been successfully retrained. Each link module in the first plurality of link modules may be bound to the multimodule data communication link in a corresponding link initialization state. A sideband link in one of the first plurality of link modules may be designated to transmit and receive link status and control messages for all bound link modules in the first plurality of link modules. A sideband link in one of the second plurality of link modules may be designated to transmit and receive link status and control messages for all bound link modules in the second plurality of link modules. In some examples, each link module in the first plurality of link modules is bound to the multimodule data communication link in accordance with UCIe specifications. The failed link module may be retrained in accordance with UCIe specifications.

Some implementation examples are described in the following numbered clauses:

1. A method for operating an interconnection between chiplets, comprising: transmitting or receiving data over a multimodule data communication link that uses a first plurality of link modules to provide data transmit lanes and data receive lanes; retraining a failed link module in the first plurality of link modules while one or more other link modules in the first plurality of link modules are active and available for transmitting or receiving data; reconfiguring the multimodule data communication link to use a second plurality of link modules that excludes the failed link module and includes fewer link modules than the first plurality of link modules; and reconfiguring the multimodule data communication link to use the first plurality of link modules for transmitting or receiving the data after the failed link module has been successfully retrained.

2. The method as described in clause 1, wherein the first plurality of link modules includes a first number of link modules that is defined by Universal Chiplet Interconnect Express (UCIe) specifications and the second plurality of link modules includes a second number of link modules that is defined by the UCIe specifications.

3. The method as described in clause 1 or clause 2, wherein the second plurality of link modules excludes at least one link module in the first plurality of link modules that is active and available for transmitting or receiving the data.

4. The method as described in any of clauses 1-3, wherein the second plurality of link modules comprises a quantity of link modules that is defined based on number of the other link modules in the first plurality of link modules that are active and available for transmitting or receiving data.
5. The method as described in any of clauses 1-4, wherein a number of data transmit lanes and data receive lanes provided by each link module is defined by UCIe specifications.
6. The method as described in clause 5, wherein each link module is configured to provide 64 data transmit lanes and 64 data receive lanes in accordance with an advanced packaging option defined by the UCIe specifications.
7. The method as described in clause 5, wherein each link module is configured to provide 16 data transmit lanes and 16 data receive lanes in accordance with a standard packaging option defined by the UCIe specifications.
8. The method as described in any of clauses 1-7, further comprising: causing each link module in the first plurality of link modules to enter a link initialization state after the failed link module has been successfully retrained, wherein each link module in the first plurality of link modules is bound to the multimodule data communication link in a corresponding link initialization state.
9. The method as described in clause 8, further comprising: designating a sideband link in one of the first plurality of link modules to transmit and receive link status and control messages for all bound link modules in the first plurality of link modules; and designating a sideband link in one of the second plurality of link modules to transmit and receive link status and control messages for all bound link modules in the second plurality of link modules.
10. The method as described in clause 8 or clause 9, wherein each link module in the first plurality of link modules is bound to the multimodule data communication link in accordance with UCIe specifications.
11. The method as described in any of clauses 1-10, wherein the failed link module is retrained in accordance with UCIe specifications.
12. A processor-readable storage medium storing code thereon, the code when executed by a processor causes a processing circuit to: transmit or receive data over a multimodule data communication link that uses a first plurality of link modules to provide data transmit lanes and data receive lanes; retrain a failed link module in the first plurality of link modules while one or more other link modules in the first plurality of link modules are active and available for transmitting or receiving data; reconfigure the multimodule data communication link to use a second plurality of link modules that excludes the failed link module and includes fewer link modules than the first plurality of link modules; and reconfigure the multimodule data communication link to use the first plurality of link modules for transmitting or receiving the data after the failed link module has been successfully retrained.
13. The processor-readable storage medium as described in clause 12, wherein the first plurality of link modules includes a first number of link modules that is defined by Universal Chiplet Interconnect Express (UCIe) specifications and the second plurality of link modules includes a second number of link modules that is defined by the UCIe specifications.
14. The processor-readable storage medium as described in clause 12 or clause 13, wherein the second plurality of link modules excludes at least one link module in the first plurality of link modules that is active and available for transmitting or receiving the data.
15. The processor-readable storage medium as described in any of clauses 12-14, wherein the second plurality of link modules comprises a quantity of link modules that is defined based on number of the other link modules in the first plurality of link modules that are active and available for transmitting or receiving data.
16. The processor-readable storage medium as described in any of clauses 12-15, wherein a number of data transmit lanes and data receive lanes provided by each link module is defined by UCIe specifications.
17. The processor-readable storage medium as described in clause 16, wherein each link module is configured to provide 64 data transmit lanes and 64 data receive lanes in accordance with an advanced packaging option defined by the UCIe specifications.
18. The processor-readable storage medium as described in clause 16, wherein each link module is configured to provide 16 data transmit lanes and 16 data receive lanes in accordance with a standard packaging option defined by the UCIe specifications.
19. The processor-readable storage medium as described in any of clauses 12-18, wherein the code further causes the processing circuit to: cause each link module in the first plurality of link modules to enter a link initialization state after the failed link module has been successfully retrained, wherein each link module in the first plurality of link modules is bound to the multimodule data communication link in a corresponding link initialization state.
20. The processor-readable storage medium as described in clause 19, wherein the code further causes the processing circuit to: designate a sideband link in one of the first plurality of link modules to transmit and receive link status and control messages for all bound link modules in the first plurality of link modules; and designate a sideband link in one of the second plurality of link modules to transmit and receive link status and control messages for all bound link modules in the second plurality of link modules.
21. The processor-readable storage medium as described in clause 19 or clause 20, wherein each link module in the first plurality of link modules is bound to the multimodule data communication link in accordance with UCIe specifications.
22. The processor-readable storage medium as described in any of clauses 12-21, wherein the failed link module is retrained in accordance with UCIe specifications.
23. A communication interface in a chiplet, comprising: a first plurality of link modules configured to provide data transmit lanes and data receive lanes in a multimodule data communication link; and a controller configured to: retrain a failed link module in the first plurality of link modules while one or more other link modules in the first plurality of link modules are active and available for transmitting or receiving data; reconfigure the multimodule data communication link to use a second plurality of link modules that excludes the failed link module and includes fewer link modules than the first plurality of link modules; and reconfigure the multimodule data communication link to use the first plurality of link modules for transmitting or receiving the data after the failed link module has been successfully retrained.

24. The communication interface as described in clause 23, wherein the first plurality of link modules includes a first number of link modules that is defined by Universal Chiplet Interconnect Express (UCIe) specifications and the second plurality of link modules includes a second number of link modules that is defined by the UCIe specifications.

25. The communication interface as described in clause 23 or clause 24, wherein the second plurality of link modules excludes at least one link module in the first plurality of link modules that is active and available for transmitting or receiving the data.

26. The communication interface as described in any of clauses 23-25, wherein the second plurality of link modules comprises a quantity of link modules that is defined based on number of the other link modules in the first plurality of link modules that are active and available for transmitting or receiving data.

27. The communication interface as described in any of clauses 23-26, wherein a number of data transmit lanes and data receive lanes provided by each link module is defined by UCIe specifications.

28. The communication interface as described in clause 27, wherein each link module is configured to provide 64 data transmit lanes and 64 data receive lanes in accordance with an advanced packaging option defined by the UCIe specifications.

29. The communication interface as described in clause 27, wherein each link module is configured to provide 16 data transmit lanes and 16 data receive lanes in accordance with a standard packaging option defined by the UCIe specifications.

30. The communication interface as described in any of clauses 23-29, wherein the controller is further configured to: cause each link module in the first plurality of link modules to enter a link initialization state after the failed link module has been successfully retrained, wherein each link module in the first plurality of link modules is bound to the multimodule data communication link in a corresponding link initialization state.

31. The communication interface as described in clause 30, wherein the controller is further configured to: designate a sideband link in one of the first plurality of link modules to transmit and receive link status and control messages for all bound link modules in the first plurality of link modules.

32. The communication interface as described in clause 30 or clause 31, wherein each link module in the first plurality of link modules is bound to the multimodule data communication link in accordance with UCIe specifications.

33. The communication interface as described in any of clauses 23-32, wherein the failed link module is retrained in accordance with UCIe specifications.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for operating an interconnection between chiplets, comprising:
    transmitting or receiving data over a multimodule data communication link that uses a first plurality of link modules to provide data transmit lanes and data receive lanes;
    retraining a failed link module in the first plurality of link modules while one or more other link modules in the first plurality of link modules are active and available for transmitting or receiving data;
    reconfiguring the multimodule data communication link to operate using one or more remaining active link modules in the first plurality of link modules to provide the data transmit lanes and the data receive lanes and without the failed link module while the failed link module is being retrained; and
    reconfiguring the multimodule data communication link to use the first plurality of link modules for transmitting or receiving the data after the failed link module has been successfully retrained.

2. The method of claim 1, wherein the first plurality of link modules includes a first number of link modules that is defined by Universal Chiplet Interconnect Express (UCIe) specifications, and wherein a number of the one or more remaining active link modules in the first plurality of link modules used when the failed link module is being retrained is defined by the UCIe specifications.

3. The method of claim 1, wherein the one or more remaining active link modules in the first plurality of link modules used when the failed link module is being retrained excludes at least one link module in the first plurality of link modules that is active and available for transmitting or receiving the data.

4. The method of claim 1, wherein the one or more remaining active link modules in the first plurality of link modules used when the failed link module is being retrained comprise a quantity of link modules that is defined based on number of the other link modules in the first plurality of link modules that remain active and are available for transmitting or receiving data.

5. The method of claim 1, wherein a number of data transmit lanes and data receive lanes provided by each link module is defined by UCIe specifications.

6. The method of claim 5, wherein each link module is configured to provide 64 data transmit lanes and 64 data receive lanes in accordance with an advanced packaging option defined by the UCIe specifications.

7. The method of claim 1, wherein each link module is configured to provide 16 data transmit lanes and 16 data receive lanes in accordance with a standard packaging option defined by Universal Chiplet Interconnect Express (UCIe) specifications.

8. The method of claim 1, further comprising:
causing each link module in the first plurality of link modules to enter a link initialization state after the failed link module has been successfully retrained, wherein the failed link module is retrained in accordance with UCIe specifications, and
wherein each link module in the first plurality of link modules is bound to the multimodule data communication link in a corresponding link initialization state.

9. The method of claim 8, further comprising:
designating a sideband link in one of the first plurality of link modules to transmit and receive link status and control messages for all bound link modules in the first plurality of link modules; and
designating a sideband link in one of the one or more remaining active link modules in the first plurality of link modules used when the failed link module is being retrained to transmit and receive link status and control messages for all bound link modules in the one or more remaining active link modules in the first plurality of link modules used when the failed link module is being retrained.

10. A communication interface in a chiplet, comprising:
a first plurality of link modules configured to provide data transmit lanes and data receive lanes in a multimodule data communication link; and
a controller configured to:
retrain a failed link module in the first plurality of link modules while one or more other link modules in the first plurality of link modules are active and available for transmitting or receiving data;
reconfigure the multimodule data communication link to operate using one or more remaining active link modules in the first plurality of link modules to provide the data transmit lanes and the data receive lanes and without the failed link module while the failed link module is being retrained; and
reconfigure the multimodule data communication link to use the first plurality of link modules for transmitting or receiving the data after the failed link module has been successfully retrained.

11. The communication interface of claim 10, wherein the first plurality of link modules includes a first number of link modules that is defined by Universal Chiplet Interconnect Express (UCIe) specifications, and wherein a number of the one or more remaining active link modules in the first plurality of link modules used when the failed link module is being retrained is defined by the UCIe specifications.

12. The communication interface of claim 10, wherein the one or more remaining active link modules in the first plurality of link modules used when the failed link module is being retrained excludes at least one link module in the first plurality of link modules that is active and available for transmitting or receiving the data.

13. The communication interface of claim 10, wherein the one or more remaining active link modules in the first plurality of link modules used when the failed link module is being retrained comprises a quantity of link modules that is defined based on number of the other link modules in the first plurality of link modules that remain active and are available for transmitting or receiving data.

14. The communication interface of claim 10, wherein a number of data transmit lanes and data receive lanes provided by each link module is defined by UCIe specifications.

15. The communication interface of claim 14, wherein each link module is configured to provide 64 data transmit lanes and 64 data receive lanes in accordance with an advanced packaging option defined by the UCIe specifications.

16. The communication interface of claim 14, wherein each link module is configured to provide 16 data transmit lanes and 16 data receive lanes in accordance with a standard packaging option defined by the UCIe specifications.

17. The communication interface of claim 10, wherein the controller is further configured to:
cause each link module in the first plurality of link modules to enter a link initialization state after the failed link module has been successfully retrained, wherein the failed link module is retrained in accordance with UCIe specifications, and
wherein each link module in the first plurality of link modules is bound to the multimodule data communication link in a corresponding link initialization state.

18. The communication interface of claim 17, wherein the controller is further configured to:
designate a sideband link in one of the first plurality of link modules to transmit and receive link status and control messages for all bound link modules in the first plurality of link modules; and
designate a sideband link in one of the one or more remaining active link modules in the first plurality of link modules used when the failed link module is being retrained to transmit and receive link status and control messages for all bound link modules in the one or more remaining active link modules in the first plurality of link modules used when the failed link module is being retrained.

19. A non-transitory processor-readable storage medium storing code thereon, the code when executed by a processor causes a processing circuit to:
transmit or receive data over a multimodule data communication link that uses a first plurality of link modules to provide data transmit lanes and data receive lanes;
retrain a failed link module in the first plurality of link modules while one or more other link modules in the first plurality of link modules are active and available for transmitting or receiving data;
reconfigure the multimodule data communication link to operate using one or more remaining active link modules in the first plurality of link modules to provide the data transmit lanes and the data receive lanes and without the failed link module while the failed link module is being retrained; and
reconfigure the multimodule data communication link to use the first plurality of link modules for transmitting or receiving the data after the failed link module has been successfully retrained.

20. The non-transitory processor-readable storage medium of claim 19, wherein the code further causes the processing circuit to:
cause each link module in the first plurality of link modules to enter a link initialization state after the failed link module has been successfully retrained, wherein the failed link module is retrained in accordance with Universal Chiplet Interconnect Express (UCIe) specifications, and wherein each link module in the first plurality of link modules is bound to the multimodule data communication link in a corresponding link initialization state.

\* \* \* \* \*